(12) United States Patent
Kamiya et al.

(10) Patent No.: US 8,845,484 B2
(45) Date of Patent: Sep. 30, 2014

(54) VEHICLE DRIVE DEVICE

(75) Inventors: Toshihiko Kamiya, Toyota (JP); Terufumi Miyazaki, Toyota (JP); Mikio Iwase, Anjo (JP); Tetsuya Yamaguchi, Anjo (JP); Yuhei Yoshioka, Anjo (JP); Keisuke Kawamoto, Sakai (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/981,463

(22) PCT Filed: Feb. 1, 2012

(86) PCT No.: PCT/JP2012/052263
§ 371 (c)(1),
(2), (4) Date: Jul. 24, 2013

(87) PCT Pub. No.: WO2012/111432
PCT Pub. Date: Aug. 23, 2012

(65) Prior Publication Data
US 2013/0310216 A1   Nov. 21, 2013

(30) Foreign Application Priority Data
Feb. 17, 2011   (JP) .................. 2011-031995

(51) Int. Cl.
*F16D 48/02*   (2006.01)
*B60W 10/02*   (2006.01)
(Continued)

(52) U.S. Cl.
CPC .................. *B60W 20/40* (2013.01); *B60K 6/48* (2013.01); *B60L 2240/423* (2013.01);
(Continued)

(58) Field of Classification Search
USPC .............. 192/3.25, 3.3, 3.33, 3.57, 59, 70.12, 192/85.25, 113.3, 113.34, 113.5
See application file for complete search history.

(56) References Cited

U.S. PATENT DOCUMENTS 8,108,115 B2    1/2012   Kobayashi et al.
8,622,182 B2 *  1/2014   Iwase et al. .................. 192/3.33
(Continued)

FOREIGN PATENT DOCUMENTS

JP    A-5-286368      11/1993
JP    A-2000-356148   12/2000
(Continued)

OTHER PUBLICATIONS

Office Action issued in Japanese Patent Application No. 2011-031995 dated Apr. 19, 2012 (with partial translation).
(Continued)

*Primary Examiner* — Jacob S Scott
(74) *Attorney, Agent, or Firm* — Oliff PLC

(57) ABSTRACT

Mutual interference between a hydraulic pressure of a first engagement device and a hydraulic pressure of a second engagement device is suppressed even in the case where operation of the first engagement device and operation of the second engagement device coincide with each other. A vehicle drive device includes a first engagement device that selectively couples a rotary electric machine to an internal combustion engine, and a fluid coupling. The first engagement device includes a first oil chamber that is formed to apply a back pressure to a first piston. The fluid coupling includes a second oil chamber configured to control an engagement state of a second engagement device. The vehicle drive device includes a first control valve that controls a first oil chamber hydraulic pressure, and a second control valve that controls a second oil chamber hydraulic pressure independently of the first oil chamber hydraulic pressure.

11 Claims, 4 Drawing Sheets

(51) Int. Cl.
| | |
|---|---|
| *F16H 45/02* | (2006.01) |
| *F16D 33/18* | (2006.01) |
| *B60K 6/48* | (2007.10) |
| *B60K 6/547* | (2007.10) |
| *B60W 20/00* | (2006.01) |
| *F16D 25/0638* | (2006.01) |
| *B60L 11/14* | (2006.01) |
| *F16D 25/10* | (2006.01) |
| *F16H 61/14* | (2006.01) |
| *B60K 6/38* | (2007.10) |
| *B60K 6/40* | (2007.10) |
| *F16H 45/00* | (2006.01) |
| *F16D 25/10* | (2013.01); |

(52) U.S. Cl.
CPC ......... *F16H 2045/0226* (2013.01); *B60K 6/547* (2013.01); *Y02T 10/6221* (2013.01); *B60L 2240/486* (2013.01); *F16D 25/0638* (2013.01); *F16H 2045/002* (2013.01); *B60L 11/14* (2013.01); *B60L 2240/36* (2013.01); *B60L 2240/445* (2013.01); *B60L 2270/145* (2013.01); *F16H 61/143* (2013.01); *Y02T 10/6252* (2013.01); *F16D 48/0206* (2013.01); *Y02T 10/7077* (2013.01); *B60W 10/023* (2013.01); *B60K 6/38* (2013.01); *Y02T 10/642* (2013.01); *F16D 48/02* (2013.01); *B60L 2240/443* (2013.01); *Y10S 903/902* (2013.01); *F16H 45/02* (2013.01); *F16H 2045/0284* (2013.01); *F16H 45/00* (2013.01); *B60K 2006/4825* (2013.01); *F16H 2045/021* (2013.01); *B60K 6/40* (2013.01)

USPC .............. 477/5; 192/3.25; 192/3.3; 192/3.33; 192/85.25; 903/902

(56) References Cited

U.S. PATENT DOCUMENTS

| | | |
|---|---|---|
| 2010/0105519 A1 | 4/2010 | Kasuya et al. |
| 2012/0080286 A1* | 4/2012 | Kasuya et al. ............. 192/113.3 |
| 2013/0111891 A1* | 5/2013 | Iwase et al. .................... 60/347 |

FOREIGN PATENT DOCUMENTS

| | | |
|---|---|---|
| JP | A-2006-137406 | 6/2006 |
| JP | A-2009-1165 | 1/2009 |
| JP | A-2009-103222 | 5/2009 |
| JP | A-2010-105450 | 5/2010 |
| JP | A-2010-216583 | 9/2010 |

OTHER PUBLICATIONS

International Search Report issued in International Patent Application No. PCT/JP2012/052263 dated Apr. 24, 2012.

* cited by examiner

VEHICLE DRIVE DEVICE

INCORPORATION BY REFERENCE

The disclosure of Japanese Patent Application No. 2011-031995 filed on Feb. 17, 2011 including the specification, drawings and abstract is incorporated herein by reference in its entirety.

BACKGROUND OF THE INVENTION

The present invention relates to a vehicle drive device including an input member drivably coupled to a rotary electric machine, an output member drivably coupled to wheels, a first engagement device that selectively drivably couples the input member to an internal combustion engine, and a fluid coupling provided on a power transfer path that connects between the input member and the output member.

DESCRIPTION OF THE RELATED ART

Devices described in Japanese Patent Application Publication No. 2006-137406 (JP 2006-137406 A) and Japanese Patent Application Publication No. 2010-105450 (JP 2010-105450 A) mentioned below are already known as examples of a vehicle drive device for a hybrid vehicle including an internal combustion engine and a rotary electric machine each serving as a drive force source. The vehicle drive devices for a hybrid vehicle described in JP 2006-137406 A and JP 2010-105450 A include a first engagement device that selectively drivably couples the internal combustion engine to a power transfer mechanism. In order that the vehicle can be driven only by a drive force of the rotary electric machine, the internal combustion engine can be disengaged from the power transfer mechanism by controlling a hydraulic pressure to be supplied to the first engagement device so that the engagement device is disengaged. That is, in the technologies according to JP 2006-137406 A and JP 2010-105450 A, the first engagement device capable of selectively drivably coupling the internal combustion engine and the power transfer system to each other through hydraulic control is provided to achieve a hybrid vehicle.

However, the technology according to JP 2006-137406 A does not disclose supplying oil to friction members of the first engagement device. Therefore, the technology according to JP 2006-137406 A does not address cooling the friction members of the first engagement device by supplying oil.

In the technology according to JP 2010-105450 A, in order to supply oil to the friction members of the first engagement device, the first engagement device is housed in a cover of a fluid coupling along with a second engagement device that directly couples (locks up) a coupling input-side member and a coupling output-side member of the fluid coupling to each other. More particularly, a body portion housing chamber that houses a body portion of the fluid coupling and a pressure difference generation chamber that houses the friction members of the first engagement device and that is formed to apply a hydraulic pressure to the side of a piston of the first engagement device opposite to the side on which a hydraulic pressure of working oil is applied are provided in the cover of the fluid coupling such that the chambers are in communication with each other (used in a shared manner). In the case where the body portion housing chamber and the pressure difference generation chamber are provided in communication with each other, in addition, it is normally considered that respective hydraulic pressure supply systems that supply a hydraulic pressure to the chambers are also used in a shared manner.

Here, the engagement state of the second engagement device of the fluid coupling is controlled at least in accordance with a hydraulic pressure to be supplied to the body portion housing chamber. The engagement state of the first engagement device is controlled in accordance with a pressure difference between the hydraulic pressure of working oil in the first engagement device and the hydraulic pressure supplied to the pressure difference generation chamber. The first and second engagement devices are controlled for their own aims, and individually controlled so as to achieve their aims.

In the technology according to JP 2010-105450 A, however, during control of one of the first and second engagement devices, fluctuations in hydraulic pressure caused in a chamber for the one engagement device or operation of the hydraulic pressure supply system for the one engagement device may affect the other to degrade the controllability of the other or both of the engagement devices since the body portion housing chamber and the pressure difference generation chamber are in communication with each other (used in a shared manner). In the case where both the engagement devices are controlled at the same time, in addition, fluctuations in hydraulic pressure caused in the respective chambers or operations of the respective hydraulic pressure supply systems may interfere with each other to degrade the controllability of both the engagement devices.

SUMMARY OF THE INVENTION

In view of the foregoing, it is desired to provide a vehicle drive device capable of improving the controllability of both a first engagement device that selectively drivably couples an internal combustion engine to a power transfer mechanism and a second engagement device that directly couples a fluid coupling by suppressing mutual interference between a hydraulic pressure for the first engagement device and a hydraulic pressure for the second engagement device.

A vehicle drive device according to an aspect of the present invention includes an input member drivably coupled to a rotary electric machine, an output member drivably coupled to wheels, a first engagement device that selectively drivably couples the input member to an internal combustion engine, and a fluid coupling provided on a power transfer path that connects between the input member and the output member. In the vehicle drive device, the first engagement device includes a first friction member, a first piston that presses the first friction member, and a first oil chamber that houses the first friction member and that is formed to be supplied with a hydraulic pressure and to apply a hydraulic pressure to a side of the first piston opposite to a side on which a hydraulic pressure for operation is applied; the fluid coupling includes a second oil chamber that is provided in a body portion housing chamber which houses a body portion of the fluid coupling and that controls an engagement state of a second engagement device in accordance with a hydraulic pressure, the second engagement device being configured to directly couple a coupling input-side member drivably coupled to an input member side of the vehicle drive device and a coupling output-side member drivably coupled to an output member side of the vehicle drive device; and the vehicle drive device includes a first hydraulic pressure control valve that controls a first oil chamber hydraulic pressure which is a hydraulic pressure to be supplied to the first oil chamber, and a second hydraulic pressure control valve that controls a second oil chamber hydraulic pressure which is a hydraulic pressure to be supplied to the second oil chamber independently of the first oil chamber hydraulic pressure, wherein the first oil chamber is provided with a circulation passage where oil supplied to a supply port from the first hydraulic pressure control valve flows along the first friction member and is discharged from a discharge port that is different from the supply port.

The term "rotary electric machine" as used herein refers to any of a motor (electric motor), a generator (electric generator), and a motor generator that functions both as a motor and as a generator as necessary.

In addition, the term "drivably coupled" as used herein refers to a state in which two rotary elements are coupled to each other in such that a drive force can be transferred, which includes a state in which the two rotary elements are coupled to each other so as to rotate together, and a state in which the two rotary elements are coupled to each other via one or two or more transmission members in such a way that a drive force can be transferred. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction clutch and a meshing type clutch. The term "fluid coupling" as used herein refers to any of a torque converter having a torque amplifying function and a normal fluid coupling having no torque amplifying function.

According to the aspect described above, the first oil chamber of the first engagement device and the second oil chamber of the second engagement device are provided separately, and the first hydraulic pressure control valve which controls the first oil chamber hydraulic pressure to be supplied to the first oil chamber and the second hydraulic pressure control valve which controls the second oil chamber hydraulic pressure to be supplied to the second oil chamber independently of the first oil chamber hydraulic pressure are provided. That is, a hydraulic pressure supply system to the first oil chamber including the first hydraulic pressure control valve and an oil passage from the first hydraulic pressure control valve to the first oil chamber and a hydraulic pressure supply system to the second oil chamber including the second hydraulic pressure control valve and an oil passage from the second hydraulic pressure control valve to the second oil chamber are provided independently. Hence, even during control of any one of the first engagement device and second engagement device, it is possible to suppress a phenomenon in which fluctuations in hydraulic pressure caused in the chamber for one of the engagement devices or operation of the hydraulic pressure supply system for one of the engagement devices affects the other to degrade the controllability of the other or both of the engagement devices. Even in the case where both the first engagement device and the second engagement device are controlled at the same time, in addition, it is possible to suppress a phenomenon in which fluctuations in hydraulic pressure caused in the respective chambers or operations of the respective hydraulic pressure supply systems interfere with each other to degrade the controllability of both the engagement devices. Thus, it is possible to improve the control accuracy of respective hydraulic pressures to be supplied to the first oil chamber and the second oil chamber, and to improve the control accuracy of the respective engagement states of the first engagement device and the second engagement device. Then, it is possible to suppress fluctuations in torque to be transferred to the wheels in engaging and disengaging the first engagement device.

The first hydraulic pressure supply system and the second hydraulic pressure supply system are provided independently of each other. Thus, even during control of one or both of the first engagement device and the second engagement device, it is possible to suppress fluctuations in amount of oil to be supplied into the first oil chamber due to mutual interference, and to suppress fluctuations in cooling performance for the first friction members provided in the first oil chamber.

The vehicle drive device may include an orifice portion that reduces a flow rate, the orifice portion being provided on a discharge oil passage through which a hydraulic pressure supplied from the first hydraulic pressure control valve to the first oil chamber is discharged from the first oil chamber.

According to the configuration, since the orifice portion is provided on the discharge port side of the first oil chamber, a hydraulic pressure in the first oil chamber positioned upstream of the orifice portion and in a supply oil passage from the first hydraulic pressure control valve to the first oil chamber can be easily made uniform, which improves the control accuracy of the hydraulic pressure in the first oil chamber. Hence, the control accuracy of the engagement state of the first engagement device can be improved. In addition, providing the orifice portion on the discharge port side of the first oil chamber allows adjusting the flow rate of oil flowing in the first oil chamber by adjusting the reduction amount of the orifice portion. This facilitates appropriately cooling the first friction member housed in the first oil chamber.

The first engagement device may include an urging mechanism that urges the first piston with a predetermined initial engagement load such that the first piston presses the first friction member in such a direction that the first friction member is engaged; and the first hydraulic pressure control valve may control the first oil chamber hydraulic pressure so as to cause the first oil chamber to generate a hydraulic pressure that presses the first piston in such a direction that the first friction member is disengaged with a load higher than the initial engagement load irrespective of whether the first engagement device is engaged or disengaged.

According to the configuration, since the urging mechanism is provided which urges the piston with a predetermined initial engagement load such that the piston presses the first friction member in such a direction that the first friction member is engaged, it is possible to bring the first engagement device into an engaged state by generating a hydraulic pressure by transferring torque of the internal combustion engine to a hydraulic pump via the first engagement device using a pressing force of the urging mechanism, by starting the internal combustion engine even in the case where the rotary electric machine, a drive circuit for the rotary electric machine, or the like fails with the first engagement device in the disengaged state and the hydraulic pump may not be driven by the rotary electric machine. Hence, the drive force of the internal combustion engine can be transferred to the wheel side of the vehicle drive device to drive the wheels even in the case where the rotary electric machine is inoperable.

According to the configuration described above, in addition, the first hydraulic pressure control valve controls the first oil chamber hydraulic pressure so as to cause the first oil chamber to generate a hydraulic pressure that presses the piston in such a direction that the first friction member is disengaged with a load higher than the initial engagement load. Thus, in a normal state in which no failure is caused, engagement of the first engagement device due to the pressing force of the urging mechanism can be released by the first oil chamber hydraulic pressure generated by the first hydraulic pressure control valve. Hence, it is possible to suppress transfer of torque of the rotary electric machine to the internal combustion engine via the first engagement device due to the pressing force of the urging mechanism when the rotary electric machine drives the wheels (during electric travel), and to suppress degradation in engine efficiency during electric travel.

The vehicle drive device may further include a first line pressure control valve that controls an output pressure of a hydraulic pump as a first line pressure, and a second line pressure control valve that controls the first line pressure as a second line pressure by further reducing the first line pressure; the first hydraulic pressure control valve may be supplied with oil at the first line pressure controlled by the first line pressure control valve, and may supply oil at the first oil chamber hydraulic pressure to the first oil chamber; and the second hydraulic pressure control valve may be supplied with oil at the second line pressure controlled by the second line pressure control valve, and may supply oil at the second oil chamber hydraulic pressure to the second oil chamber.

The first line pressure, which is an output pressure of the hydraulic pump, is reached quickly after drive of the hydraulic pump is started. On the other hand, the second line pressure, which is generated by reducing the first line pressure, is reached later than the first line pressure after drive of the hydraulic pump is started. According to the configuration described above, the first line pressure, which is an output pressure of the hydraulic pump, is supplied to the first hydraulic pressure control valve. Thus, the first oil chamber hydraulic pressure, which is controlled by the first hydraulic pressure control valve, can be reached and supplied into the first oil chamber quickly after drive of the hydraulic pump is started. Hence, it is possible to generate a hydraulic pressure to be applied to a side of the first piston opposite to a side on which a hydraulic pressure for operation is applied quickly after drive of the hydraulic pump is started, which secures the operation accuracy of the first engagement device and secures the cooling performance for the first friction member housed in the first oil chamber. In addition, in the case where the urging mechanism is provided which presses the first friction member in such a direction that the first friction member is engaged as described above, it is possible to release engagement of the first engagement device due to the pressing force of the urging mechanism quickly after drive of the hydraulic pump is started.

On the other hand, the second line pressure is controlled by further reducing the first line pressure, and therefore less affected by pressure pulsations caused by discharge of the hydraulic pump than the first line pressure which is easily affected by such pressure pulsations, and thus more stable. According to the configuration described above, the second line pressure, which is generated by further reducing the first line pressure, is supplied to the second hydraulic pressure control valve, and thus a stable second oil chamber hydraulic pressure can be generated using the second line pressure which is more stable than the first line pressure. Hence, the operation accuracy of the second engagement device can be stabilized.

In particular, in the case where the second engagement device includes an urging mechanism that presses the second friction member in such a direction that the second friction member is disengaged, it is not necessary to release engagement of the second engagement device due to an urging mechanism quickly after drive of the hydraulic pump is started, unlike the first engagement device. Therefore, the second engagement device can be operated stably after drive of the hydraulic pump is started also by using the second line pressure.

The second engagement device may include a second friction member and a second piston that presses the second friction member; and the second oil chamber may house therein the second friction member and the coupling input-side member and the coupling output-side member of the fluid coupling, and may be formed to be supplied with a hydraulic pressure and to apply a hydraulic pressure to a side of the second piston opposite to a side on which a hydraulic pressure for operation is applied.

According to the configuration, as in the case of the first engagement device, it is possible to improve the control accuracy of a hydraulic pressure applied to a side of the second piston opposite of the second engagement device opposite to a side on which a hydraulic pressure for operation is applied, and to improve the control accuracy of the engagement state of the second engagement device. In addition, fluctuations in cooling performance for the second friction member housed in the second oil chamber can be suppressed.

DETAILED DESCRIPTION OF THE EMBODIMENTS

First Embodiment

Figure 1:
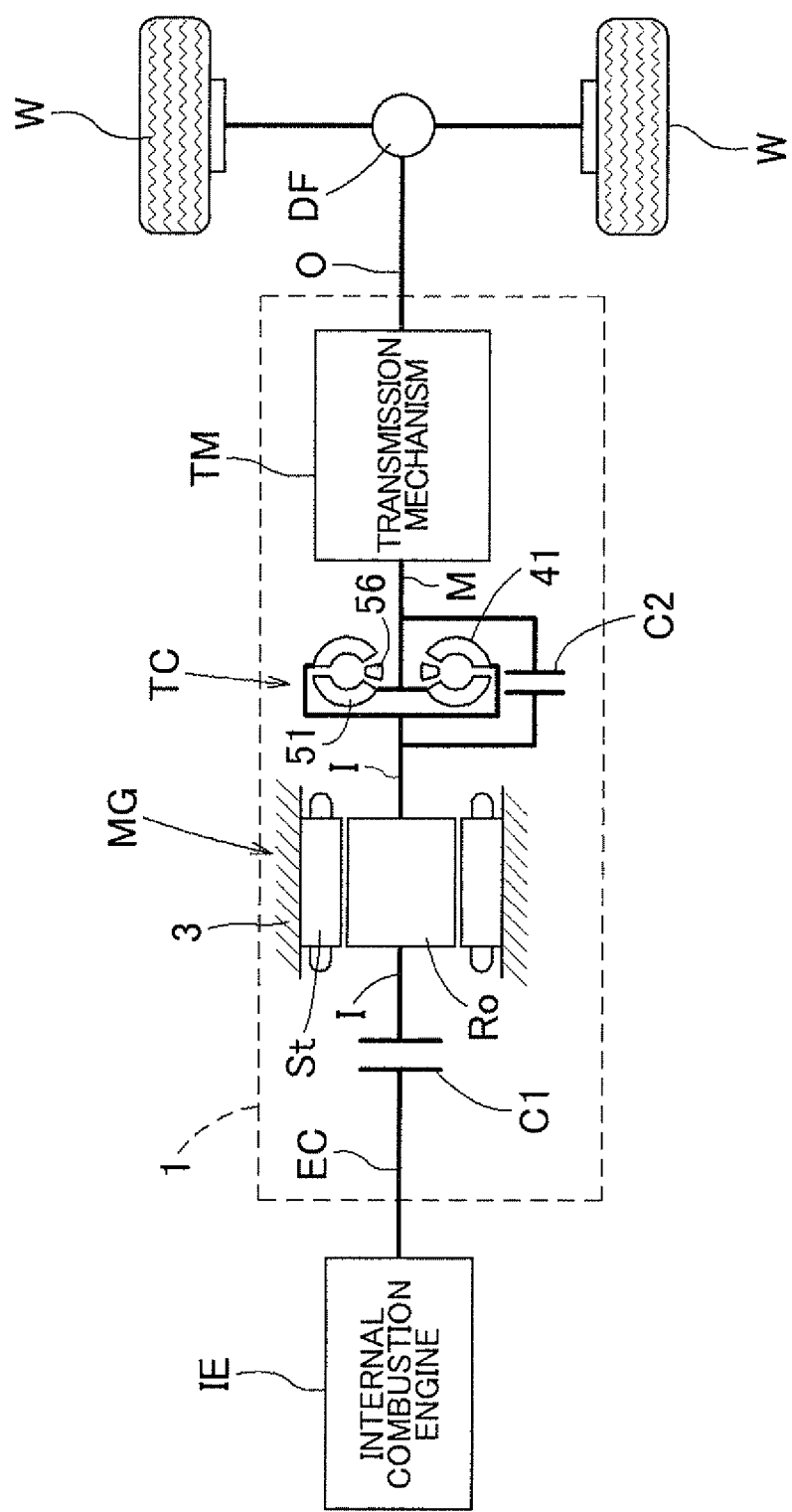
FIG. 1 is a schematic diagram showing a schematic configuration of a drive transfer system of a vehicle drive device according to an embodiment of the present invention.

A vehicle drive device 1 (hereinafter referred to as "drive device 1") according to an embodiment of the present invention will be described with reference to the drawings. FIG. 1 is a schematic diagram showing a schematic configuration of the drive device 1 according to the embodiment. As shown in the drawing, the drive device 1 according to the embodiment is generally configured to include an internal combustion engine IE and a rotary electric machine MG each serving as a drive force source, and to transfer drive forces of the drive force sources to wheels W via a power transfer mechanism. The drive device 1 includes an input shaft I drivably coupled to the rotary electric machine MG, an output shaft O drivably coupled to the wheels W, a first engagement device C1 that selectively drivably couples the input shaft I to the internal combustion engine IE, and a torque converter TC that serves as a fluid coupling provided on a power transfer path that connects between the input shaft I and the output shaft O. In the embodiment, the drive device 1 includes a transmission device TM provided on the power transfer path between the torque converter TC and the output shaft O. The input shaft I corresponds to the "input member" according to the present invention. The output shaft O corresponds to the "output member" according to the present invention.

Figure 2:
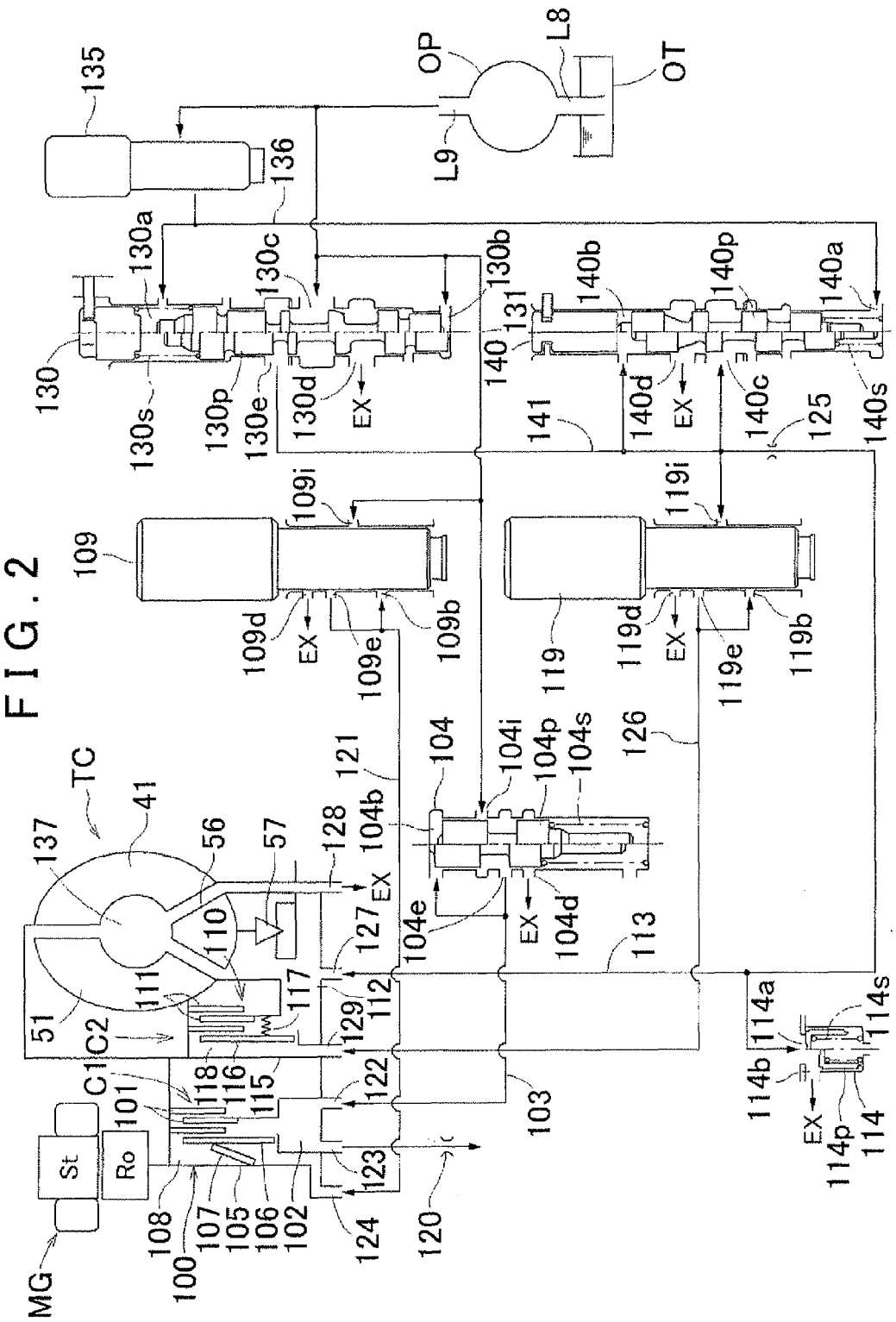
FIG. 2 is a diagram showing a schematic configuration of a hydraulic control system of the vehicle drive device according to the embodiment of the present invention.
Figure 3:
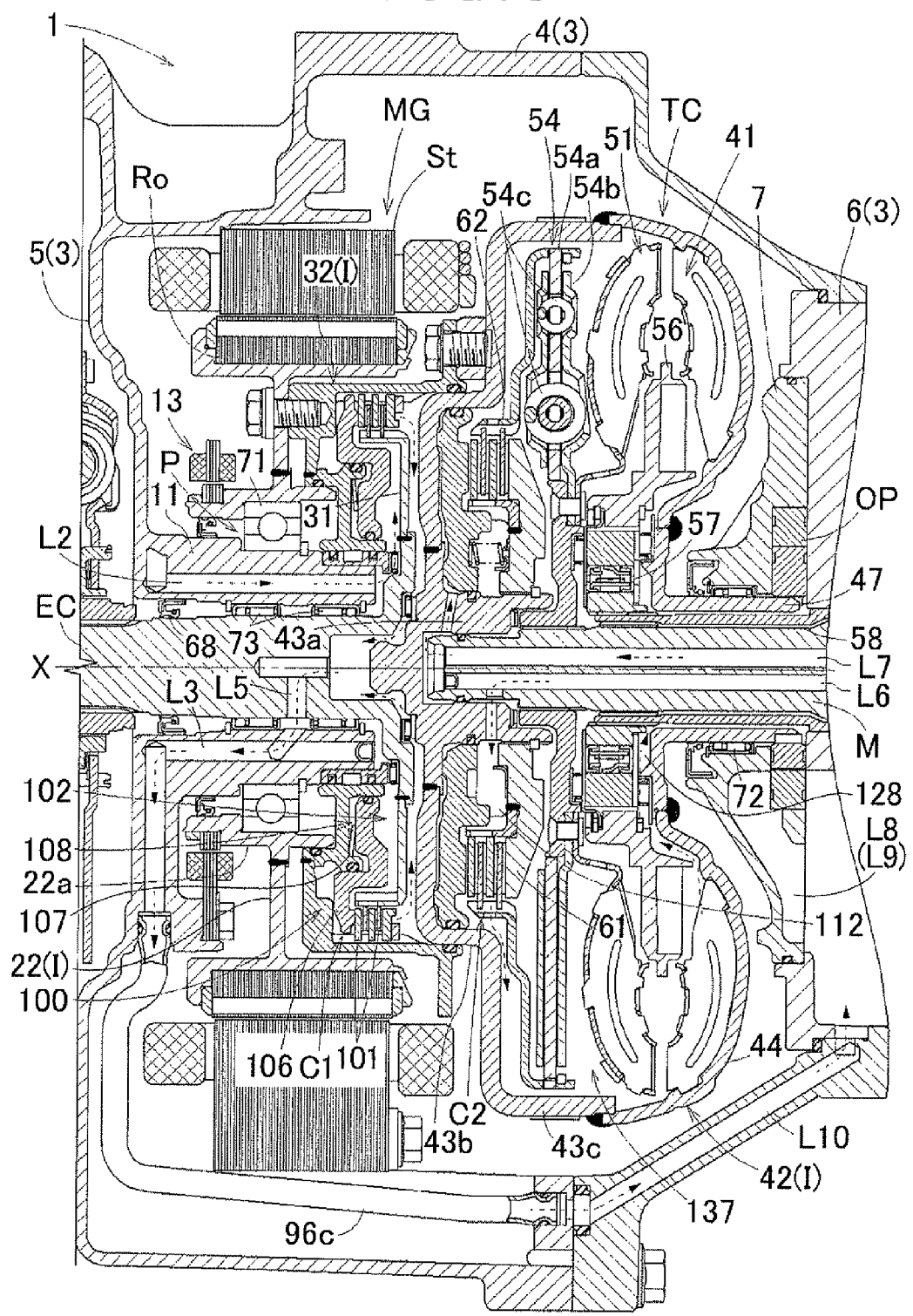
FIG. 3 is a cross-sectional view of the vehicle drive device according to the embodiment of the present invention.

In such a configuration, as shown in FIGS. 2 and 3, the first engagement device C1 includes first friction members 101, a first piston 106 that presses the first friction members 101, and a first oil chamber 102 that houses the first friction members 101 and that is formed to be supplied with a hydraulic pressure and to apply a hydraulic pressure to the side of the first piston 106 opposite to the side on which a hydraulic pressure for operation is applied, or the back pressure side of the first piston 106.

The torque converter TC includes a second oil chamber 112 that is provided in a body portion housing chamber 137 which houses a body portion of the torque converter TC and that controls the engagement state of a second engagement device C2 in accordance with a hydraulic pressure. The second engagement device C2 is configured to directly couple a pump impeller 41 drivably coupled to the input shaft I side of the drive device 1 and a turbine runner 51 drivably coupled to the output shaft O side of the drive device 1. The pump impeller 41 corresponds to the "coupling input-side member" according to the present invention. The turbine runner 51 corresponds to the "coupling output-side member" according to the present invention.

The drive device 1 is characterized by including a first hydraulic pressure control valve 104 that controls a first oil chamber hydraulic pressure 103 which is a hydraulic pressure to be supplied to the first oil chamber 102, and a second hydraulic pressure control valve 114 that controls a second oil chamber hydraulic pressure 113 which is a hydraulic pressure to be supplied to the second oil chamber 112 independently of the first oil chamber hydraulic pressure 103. The drive device 1 according to the embodiment will be described in detail below.

1. Configuration of Drive Transfer System of Drive Device

First, the configuration of the drive transfer system of the drive device 1 according to the embodiment will be described. As shown in FIG. 1, the drive device 1 serves as a drive device 1 for a hybrid vehicle of a parallel type which includes the internal combustion engine IE and the rotary electric machine MG each serving as a drive force source for driving the vehicle, and in which the internal combustion engine IE and the rotary electric machine MG are drivably coupled to each other in series. In the embodiment, the drive device 1 includes the torque converter TC and the transmission device TM as a power transfer mechanism, and the torque converter TC and the transmission device TM transfer rotation of the internal combustion engine IE and the rotary electric machine MG each serving as a drive force source to the output shaft O while changing the rotational speed and converting torque. In the drive device 1 according to the embodiment, the internal combustion engine IE, the rotary electric machine MG, the torque converter TC, and the transmission device TM are disposed coaxially with each other, and the rotary electric machine MG, the torque converter TC, and the transmission device TM are arranged in this order from the internal combustion engine IE side of the drive device 1 toward the output shaft O along the axial direction. In addition, an internal combustion engine coupling shaft EC, the input shaft I, an intermediate shaft M, and the output shaft O are also disposed coaxially with the components described above. Here, the axis of the various members of the drive device 1 disposed coaxially with each other is defined as "device axis X1". The simple terms "axial direction", "radial direction", and "circumferential direction" as used in the description of the embodiment refer to respective directions defined with reference to the device axis X1.

The internal combustion engine IE is a motor that outputs power through combustion of fuel. Various internal combustion engines known in the art such as a gasoline engine and a diesel engine may be used as the internal combustion engine IE. In the example, an output rotary shaft of the internal combustion engine IE, such as a crankshaft, is drivably coupled to the input shaft I via the internal combustion engine coupling shaft EC and the first engagement device C1. This allows the first engagement device C1 to selectively drivably couple the input shaft I to the internal combustion engine IE. The first engagement device C1 is a friction engagement element that is engaged and disengaged in accordance with a hydraulic pressure for operation supplied from a first servo hydraulic pressure control valve 109 (see FIG. 2). A wet multi-plate clutch or a wet multi-plate brake, for example, may be suitably used as the friction engagement element. It is also suitable that the output rotary shaft of the internal combustion engine IE is drivably coupled to the internal combustion engine coupling shaft EC integrally or via other members such as a damper.

The rotary electric machine MG includes a stator St fixed to a case 3 and a rotor Ro supported radially inwardly of the stator St such that the rotor Ro is freely rotatable. The rotor Ro of the rotary electric machine MG is drivably coupled to the input shaft I so as to rotate together with the input shaft I. That is, in the embodiment, both the internal combustion engine IE and the rotary electric machine MG are drivably coupled to the input shaft I. The rotary electric machine MG is electrically connected to a battery (not shown) that serves as an electricity accumulation device. The rotary electric machine MG can function as a motor (electric motor) that is supplied with electric power to produce power and as a generator (electric generator) that is supplied with power to generate electric power. That is, the rotary electric machine MG performs power running using electric power supplied from the battery, or generates electric power using a rotational drive force transferred from the internal combustion engine IE or the wheels to accumulate the generated electric power in the battery. The battery is an example of the electricity accumulation device. Other types of electricity accumulation devices such as a capacitor may be used, or a plurality of types of electricity accumulation devices may be used in combination.

In the embodiment, the torque converter TC is provided on a power transfer path that connects between the input shaft I and the output shaft O. The torque converter TC is a device that transfers a rotational drive force of the internal combustion engine IE and the rotary electric machine MG each serving as a drive force source to the output shaft O side. The torque converter TC includes the pump impeller 41 which serves as coupling input-side member drivably coupled to the rotary electric machine MG (input shaft I), the turbine runner 51 which serves as a coupling output-side member drivably coupled to the transmission device TM (intermediate shaft M), and a stator 56 provided between the pump impeller 41 and the turbine runner 51 and including a one-way clutch 57. The torque converter TC transfers a drive force between the pump impeller 41 on the driving side and the turbine runner 51 on the driven side via oil filling the torque converter TC.

The torque converter TC includes the second engagement device C2 which serves as a friction engagement element for lock-up. The second engagement device C2 is a clutch that couples the pump impeller 41 and the turbine runner 51 so that the pump impeller 41 and the turbine runner 51 rotate together in order to enhance the transfer efficiency by eliminating the difference in rotational speed (slipping) between the pump impeller 41 and the turbine runner 51. Thus, in the case where the second engagement device C2 is engaged, the torque converter TC directly transfers the drive force of the drive force source to the transmission device TM (intermediate shaft M) not via oil (a fluid) filling the torque converter TC. In the embodiment, the second engagement device C2 is engaged and disengaged in accordance with a hydraulic pressure for operation supplied from a second servo hydraulic pressure control valve 119.

In addition, the drive device 1 includes a hydraulic pump OP drivably coupled to the pump impeller 41 side of the torque converter TC. The hydraulic pump OP is driven by a rotational drive force transferred from the drive force source to generate a hydraulic pressure by sucking oil reserved in an oil reserving portion OT and to supply the generated hydraulic pressure to a hydraulic control device (see FIG. 2).

The transmission device TM is drivably coupled to the intermediate shaft M which serves as the output shaft of the torque converter TC. In the embodiment, the transmission device TM is a stepped automatic transmission device that provides a plurality of shift speeds with different speed ratios. In order to establish the shift speeds, the transmission device TM includes a gear mechanism such as a planetary gear mechanism and a plurality of friction engagement elements. In the example, the friction engagement elements are each an engagement element such as a clutch and a brake formed to include friction members. Oil regulated by a hydraulic control device for the transmission device TM is supplied to each of the friction engagement elements for engagement and disengagement. A wet multi-plate clutch or a wet multi-plate brake, for example, may be suitably used as the friction engagement elements. Torque transferred from the transmission device TM to the output shaft O is distributed and transferred to the two, left and right, wheels W via an output differential gear mechanism DF.

2. Hydraulic Control System

Next, the configuration of the hydraulic control system related to the first engagement device C1 and the second engagement device C2 will be described with reference to FIG. 2.

As described above, the first engagement device C1 includes a first hydraulic servo mechanism 100 including the first piston 106, the first friction members 101, the first piston 106 which presses the first friction members 101, and the first oil chamber 102 which houses the first friction members 101 and which is formed to be supplied with a hydraulic pressure and to apply a hydraulic pressure to the side of the first piston 106 opposite to the side on which a hydraulic pressure for operation is applied, or the back pressure side of the first piston 106.

The torque converter TC includes the second oil chamber 112 that is provided in the body portion housing chamber 137 which houses a body portion of the torque converter TC and that controls the engagement state of the second engagement device C2 in accordance with a hydraulic pressure. The second engagement device C2 is configured to directly couple the pump impeller 41 drivably coupled to the input shaft I side and the turbine runner 51 drivably coupled to the output shaft O side.

In the embodiment, as shown in FIG. 2, the torque converter TC includes the second engagement device C2, which includes a second hydraulic servo mechanism 110 including a second piston 116, second friction members 111, and the second piston 116 which presses the second friction members 111. The second oil chamber 112 houses the second friction members 111 of the second engagement device C2 and the pump impeller 41 and the turbine runner 51 of the torque converter TC, and is formed to be supplied with a hydraulic pressure and to apply a hydraulic pressure to the side of the second piston 116 opposite to the side on which a hydraulic pressure for operation is applied, or the back pressure side of the second piston 116.

The drive device 1 includes the first servo hydraulic pressure control valve 109 and the second servo hydraulic pressure control valve 119. In addition, the drive device 1 includes the first hydraulic pressure control valve 104 which controls the first oil chamber hydraulic pressure 103 which is a hydraulic pressure to be supplied to the first oil chamber 102, and the second hydraulic pressure control valve 114 which controls the second oil chamber hydraulic pressure 113 which is a hydraulic pressure to be supplied to the second oil chamber 112 independently of the first oil chamber hydraulic pressure 103.

Here, the phrase "the side of the first piston 106 on which a hydraulic pressure for operation is applied" refers to the first servo oil chamber 108 side of the first piston 106, and the phrase "the side of the first piston 106 opposite to the side on which a hydraulic pressure for operation is applied (back pressure side)" refers to the first oil chamber 102 side of the first piston 106. In the following description, a hydraulic pressure applied to the side of the first piston 106 opposite to the side on which a hydraulic pressure for operation is applied (back pressure side) is referred to as "back pressure of the first piston 106" or "back pressure of the first hydraulic servo mechanism 100". The first hydraulic servo mechanism 100 includes the first piston 106, a first cylinder 105, and the first servo oil chamber 108 which is surrounded by the first cylinder 105 and the first piston 106.

Similarly, the phrase "the side of the second piston 116 on which a hydraulic pressure for operation is applied" refers to the second servo oil chamber 118 side of the second piston 116, and the phrase "the side of the second piston 116 opposite to the side on which a hydraulic pressure for operation is applied (back pressure side)" refers to the second oil chamber 112 side of the second piston 116. In the following description, a hydraulic pressure applied to the side of the second piston 116 opposite to the side on which a hydraulic pressure for operation is applied (back pressure side) is referred to as "back pressure of the second piston 116" or "back pressure of the second hydraulic servo mechanism 110". The second hydraulic servo mechanism 110 includes the second piston 116, a second cylinder 115, and the second servo oil chamber 118 which is surrounded by the second cylinder 115 and the second piston 116.

In the embodiment, the body portion housing chamber 137 is formed to house, as a body portion of the torque converter TC, at least the pump impeller 41, the turbine runner 51, and the stator 56. The second oil chamber 112 is formed in a cover member of the torque converter TC integrally with the body portion housing chamber 137 in communication therewith. In the following, the body portion housing chamber 137 and the second oil chamber 112 are simply collectively referred to as "second oil chamber 112".

The drive device 1 for a hybrid vehicle according to the embodiment include the first engagement device C1 which selectively drivably couples the internal combustion engine IE to the power transfer mechanism. In the case where the vehicle is driven only by a drive force of the rotary electric machine MG, the internal combustion engine IE can be disengaged from the power transfer mechanism by controlling a hydraulic pressure to be supplied to the first engagement device C1 so that the first engagement device C1 is disengaged. In the case where the vehicle is driven using a drive force of the internal combustion engine IE, on the other hand, the internal combustion engine IE is drivably coupled to the power transfer mechanism by controlling a hydraulic pressure to be supplied to the first engagement device C1 so that the first engagement device C1 is engaged.

In engaging the first engagement device C1, a torque shock may be caused and transferred to the wheels W. In order to suppress that, in the case where the second engagement device C2 of the torque converter TC is engaged and the pump impeller 41 and the turbine runner 51 are directly coupled to each other, the second engagement device C2 is controlled to a disengaged state or a slipping engagement state in engaging the first engagement device C1. This makes it possible to suppress transfer of a torque shock caused by the first engagement device C1 to the wheels W side of the drive device 1 with respect to the torque converter TC. In addition, in disengaging the first engagement device C1, a torque shock may be caused, and similarly the second engagement device C2 is controlled to a disengaged state or a slipping engagement state. Thus, in the case where a hydraulic pressure to be supplied to the first engagement device C1 is controlled, a hydraulic pressure to be supplied to the second engagement device C2 is controlled at the same time. In this case, in order to suppress fluctuations in torque to be transferred to the wheels W, it is desirable to improve the control accuracy of respective hydraulic pressures to be supplied to the first engagement device C1 and the second engagement device C2.

In the embodiment, as discussed later, the first oil chamber 102 which generates a back pressure of the first hydraulic servo mechanism 100 (first piston 106) of the first engagement device C1 and the second oil chamber 112 which generates a back pressure of the second hydraulic servo mechanism 110 (second piston 116) of the second engagement device C2 are provided independently of each other. Hence, even in the case where the first hydraulic servo mechanism 100 of the first engagement device C1 and the second hydraulic servo mechanism 110 of the second engagement device C2 are operated at the same time, mutual interference between fluctuations in hydraulic pressure in the first oil chamber 102 caused by operation of the first hydraulic servo mechanism 100 and fluctuations in hydraulic pressure in the second oil chamber 112 caused by operation of the second hydraulic servo mechanism 110 can be prevented. Thus, it is possible to improve the control accuracy of the back pressure of the first hydraulic servo mechanism 100 and the back pressure of the second hydraulic servo mechanism 110, and to improve the control accuracy of engagement and disengagement of the first engagement device C1 and the second engagement device C2.

In the embodiment, in addition, as described above, the first hydraulic pressure control valve 104 which controls the first oil chamber hydraulic pressure 103 to be supplied to the first oil chamber 102 and the second hydraulic pressure control valve 114 which controls the second oil chamber hydraulic pressure 113 to be supplied to the second oil chamber 112 independently of the first oil chamber hydraulic pressure 103 are provided. That is, a hydraulic pressure supply system (first hydraulic pressure supply system) to the first oil chamber 102 including the first hydraulic pressure control valve 104 and an oil passage from the first hydraulic pressure control valve 104 to the first oil chamber 102 and a hydraulic pressure supply system (second hydraulic pressure supply system) to the second oil chamber 112 including the second hydraulic pressure control valve 114 and an oil passage from the second hydraulic pressure control valve 114 to the second oil chamber 112 are provided independently. Hence, in the case where the first hydraulic servo mechanism 100 of the first engagement device C1 and the second hydraulic servo mechanism 110 of the second engagement device C2 are operated at the same time, mutual interference between fluctuations in hydraulic pressure in the first oil chamber 102 and fluctuations in hydraulic pressure in the second oil chamber 112 and between operation of the first hydraulic pressure supply system and operation of the second hydraulic pressure supply system can be suppressed. Thus, it is possible to improve the control accuracy of the back pressure of the first hydraulic servo mechanism 100 and the back pressure of the second hydraulic servo mechanism 110, and to improve the control accuracy of the respective engagement states of the first engagement device C1 and the second engagement device C2. Then, it is possible to suppress fluctuations in torque to be transferred to the wheels W in engaging and disengaging the first engagement device C1.

In the embodiment, the drive device 1 includes a first orifice portion 120 that serves as an orifice portion that reduces a flow rate and that is provided on a discharge oil passage through which a hydraulic pressure supplied from the first hydraulic pressure control valve 104 to the first oil chamber 102 is discharged from the first oil chamber 102. The first orifice portion 120 corresponds to the "orifice portion" according to the present invention.

Since the first orifice portion 120 is provided on the discharge port side of the first oil chamber 102, a hydraulic pressure in the first oil chamber 102 positioned upstream of the first orifice portion 120 and in a supply oil passage from the first hydraulic pressure control valve 104 to the first oil chamber 102 can be easily made uniform. Hence, it is possible to improve the control accuracy of the hydraulic pressure in the first oil chamber 102, and to improve the control accuracy of the engagement state of the first engagement device C1. In addition, providing the first orifice portion 120 on the discharge port side of the first oil chamber 102 allows adjusting the flow rate of oil flowing in the first oil chamber 102 by adjusting the reduction amount of the first orifice portion 120. This facilitates appropriately cooling the first friction members 101 housed in the first oil chamber 102.

In the embodiment, in addition, a first urging mechanism 107 is provided that urges the first piston 106 with a predetermined initial engagement load such that the first piston 106 presses the first friction members 101 in such a direction that the first friction members 101 are engaged. The first hydraulic pressure control valve 104 controls the first oil chamber hydraulic pressure 103 so as to cause the first oil chamber 102 to generate a back pressure that presses the first piston 106 in such a direction that the first friction members 101 are disengaged with a load higher than the initial engagement load. The first urging mechanism 107 corresponds to the "urging mechanism" according to the present invention.

Since the first urging mechanism 107 is provided which urges the first piston 106 with a predetermined initial engagement load such that the first piston 106 presses the first friction members 101 in such a direction that the first friction members 101 are engaged, it is possible to bring the first engagement device C1 into an engaged state by generating a hydraulic pressure by transferring torque of the internal combustion engine IE to the hydraulic pump OP via the first engagement device C1 using a pressing force of the first urging mechanism 107, by starting the internal combustion engine IE using a starter even in the case where the rotary electric machine MG, a drive circuit for the rotary electric machine MG, or the like fails with the first engagement device C1 in the disengaged state and the hydraulic pump OP may not be driven by the rotary electric machine MG. Hence, the drive force of the internal combustion engine IE can be transferred to the wheels W side to drive the wheels W even in the case where the rotary electric machine MG is inoperable.

In the embodiment, in addition, as described above, the first hydraulic pressure control valve 104 controls the first oil chamber hydraulic pressure 103 so as to cause the first oil chamber 102 to generate a hydraulic pressure that presses the first piston 106 in such a direction that the first friction members 101 are disengaged with a load higher than the initial engagement load. Thus, in a normal state in which no failure is caused, engagement of the first engagement device C1 due to the pressing force of the first urging mechanism 107 can be released by the first oil chamber hydraulic pressure 103 generated by the first hydraulic pressure control valve 104. Hence, it is possible to suppress transfer of torque of the rotary electric machine MG to the internal combustion engine IE via the first engagement device C1 due to the pressing force of the first urging mechanism 107 when the rotary electric machine MG drives the wheels W (during electric travel), and to suppress degradation in engine efficiency during electric travel.

In the embodiment, in addition, the drive device 1 includes a first line pressure control valve 130 that controls an output pressure of the hydraulic pump OP as a first line pressure 131, and a second line pressure control valve 140 that controls the first line pressure 131 as a second line pressure 141 by further reducing the first line pressure 131. The first hydraulic pressure control valve 104 is supplied with oil at the first line pressure 131 controlled by the first line pressure control valve 130, and supplies oil at the first oil chamber hydraulic pressure 103 to the first oil chamber 102. The second hydraulic pressure control valve 114 is supplied with oil at the second line pressure 141 controlled by the second line pressure control valve 140, and supplies oil at the second oil chamber hydraulic pressure 113 to the second oil chamber 112.

The first line pressure 131, which is an output pressure of the hydraulic pump OP, is reached quickly after drive of the hydraulic pump OP is started, for example, in order to start the drive device 1. On the other hand, the second line pressure 141, which is generated by reducing the first line pressure 131, is reached later than the first line pressure 131 after drive of the hydraulic pump OP is started. In the embodiment, as described above, the first line pressure 131, which is an output pressure of the hydraulic pump OP, is supplied to the first hydraulic pressure control valve 104. Thus, the first oil chamber hydraulic pressure 103, which is controlled by the first hydraulic pressure control valve 104, is reached and supplied into the first oil chamber 102 quickly after drive of the hydraulic pump OP is started. Hence, it is possible to generate a back pressure of the first hydraulic servo mechanism 100 (first piston 106) quickly after drive of the hydraulic pump OP is started, which secures the operation accuracy of the first engagement device C1 and releases engagement of the first engagement device C1 due to the pressing force of the first urging mechanism 107. In addition, it is possible to secure the cooling performance for the first friction members 101 housed in the first oil chamber 102.

On the other hand, the second line pressure 141 is a hydraulic pressure generated by further reducing the first line pressure 131, and therefore is less affected by pressure pulsations caused by discharge of the hydraulic pump OP than the first line pressure 131 which is easily affected by such pressure pulsations, and thus more stable. In the embodiment, as described above, the second line pressure 141, which is generated by further reducing the first line pressure 131, is supplied to the second hydraulic pressure control valve 114, and thus a stable second oil chamber hydraulic pressure 113 can be generated using the second line pressure 141 which is more stable than the first line pressure 131. Hence, the operation accuracy of the second engagement device C2 can be stabilized.

In particular, in the case where the second engagement device C2 includes a second urging mechanism 117 that presses the second friction members 111 in such a direction that the second friction members 111 are disengaged, it is not necessary to release engagement of the second engagement device C2 due to an urging mechanism after drive of the hydraulic pump OP is started unlike the first engagement device C1. Therefore, the second engagement device C2 can be operated stably after drive of the hydraulic pump OP is started also by using the second line pressure 141.

2-1. Detailed Configuration of First Line Pressure Control Valve

Next, the configuration of components of the hydraulic control system shown in FIG. 2 will be described in detail.

In the embodiment, a pressure regulator valve that is a type of a pressure regulation valve including a spool 130$p$, a spring 130$s$ that urges the spool 130$p$, and so forth is used as the first line pressure control valve 130 which controls (regulates) an output pressure of the hydraulic pump OP as the first line pressure 131. That is, the first line pressure control valve 130 regulates the first line pressure 131 by adjusting the drain amount of oil discharged from the hydraulic pump OP in accordance with the balance between the pressing force with which the spool 130$p$ is pressed in a first direction (downward in FIG. 2) by a reference pressure 136 supplied to a reference pressure chamber 130$a$ and the spring 130$s$ and the pressing force with which the spool 130$p$ is pressed in a second direction (upward in FIG. 2) by the first line pressure 131 supplied to a feedback pressure chamber 130$b$. Specifically, in the case where the pressing force in the second direction by the first line pressure 131 exceeds the pressing force in the first direction by the reference pressure 136 and the spring 130$s$, the spool 130$p$ is moved in the second direction to increase the amount of opening of communication between a pressure regulation port 130$c$ to which the first line pressure 131 is supplied and a discharge port 130$d$. This increases the amount of oil discharged from the hydraulic pump OP to be drained from the discharge port 130$d$, and reduces the first line pressure 131. Conversely, in the case where the pressing force in the second direction by the first line pressure 131 falls below the pressing force in the first direction by the reference pressure 136 and the spring 130$s$, the spool 130$p$ is moved in the first direction to reduce the amount of opening of communication between the pressure regulation port 130$c$ and the discharge port 130$d$. This reduces the drain amount from the discharge port 130$d$, and increases the first line pressure 131. Hence, the first line pressure control valve 130 regulates the first line pressure 131 in a feedback manner by increasing and decreasing the amount of opening of communication with the discharge port 130$d$ through movement of the spool 130$p$ such that the pressing force in the second direction by the first line pressure 131 and the pressing force in the first direction by the reference pressure 136 and the spring 130$s$ are balanced against each other. In the hydraulic control system shown in FIG. 2, oil at the first line pressure 131 is fed to the first hydraulic pressure control valve 104 which controls a hydraulic pressure to be supplied to the first engagement device C1, the first servo hydraulic pressure control valve 109, and so forth. In addition, oil drained from the discharge port 130$d$ is fed to the oil reserving portion OT or a suction port of the hydraulic pump OP.

The reference pressure 136 supplied to the reference pressure chamber 130$a$ is controlled (regulated) by a reference pressure control valve 135. In the embodiment, a linear solenoid valve that is a hydraulic control valve that have a combination of respective functions of a solenoid and a pressure regulation valve (pressure reduction valve) is used as the reference pressure control valve 135. The reference pressure control valve 135 generates the reference pressure 136 by controlling the amount by which a hydraulic pressure supplied from the hydraulic pump OP is reduced in accordance with the drive force of the solenoid.

2-2. Detailed Configuration of Second Line Pressure Control Valve

In the embodiment, the reference pressure 136 controlled (regulated) by the reference pressure control valve 135 is also supplied to the second line pressure control valve 140. As with the first line pressure control valve 130, a pressure regulator valve that is a type of a pressure regulation valve including a spool 140$p$, a spring 140$s$ that urges the spool 140$p$, and so forth is used as the second line pressure control valve 140. That is, as with the first line pressure control valve 130, the second line pressure control valve 140 regulates the second line pressure 141 by further reducing the first line pressure 131 by adjusting the drain amount of oil supplied from an output port 130$e$ of the first line pressure control valve 130 in accordance with the balance between the pressing force with which the spool 140$p$ is pressed in the second direction (upward in FIG. 2) by the reference pressure 136 supplied to a reference pressure chamber 140$a$ and the spring 140$s$ and the pressing force with which the spool 140$p$ is pressed in the first direction (downward in FIG. 2) by the second line pressure 141 supplied to a feedback pressure chamber 140$b$. In the hydraulic control system shown in FIG. 2, oil at the second line pressure 141 is fed to the second hydraulic pressure control valve 114 which controls a hydraulic pressure to be supplied to the second engagement device C2, the second servo hydraulic pressure control valve 119, and so forth. In addition, oil drained from a discharge port 140$d$ is fed to the oil reserving portion OT or the suction port of the hydraulic pump OP.

2-3. Detailed Configuration of First Hydraulic Pressure Control Valve

In the embodiment, the first line pressure 131 controlled (regulated) by the first line pressure control valve 130 is supplied to the first hydraulic pressure control valve 104. In the example, a type of a pressure regulation valve (pressure reduction valve) that includes a spool 104$p$, a spring 104$s$ that urges the spool 104$p$, and so forth and that opens and closes an oil passage from a source pressure and opens and closes an oil passage to a drain at the same time is used as the first hydraulic pressure control valve 104. That is, the first hydraulic pressure control valve 104 regulates the first oil chamber hydraulic pressure 103 by further reducing the first line pressure 131 by adjusting the supply amount of oil at the first line pressure 131 and the drain amount of oil at the first oil chamber hydraulic pressure 103 in accordance with the balance between the pressing force with which the spool 104$p$ is pressed in the second direction (upward in FIG. 2) by the spring 104$s$ and the pressing force with which the spool 104$p$ is pressed in the first direction (downward in FIG. 2) by the first oil chamber hydraulic pressure 103 supplied to a feedback pressure chamber 104$b$.

Specifically, in the case where the pressing force in the first direction by the first oil chamber hydraulic pressure 103 exceeds the pressing force in the second direction by the spring 104$s$, the spool 104$p$ is moved in the first direction to increase the amount of opening of communication between an output port 104$e$ that outputs the first oil chamber hydraulic pressure 103 and a discharge port 104$d$ and to reduce the amount of opening of communication between the output port 104$e$ and an input port 104$i$. This increases the amount of oil at the first oil chamber hydraulic pressure 103 to be drained from the discharge port 104$d$ and reduces the amount of oil at the first line pressure 131 to be supplied from the input port 104$i$ to the output port 104$e$, which varies the variation rate of the first oil chamber hydraulic pressure 103 such that the first oil chamber hydraulic pressure 103 is reduced. Conversely, in the case where the pressing force in the first direction by the first oil chamber hydraulic pressure 103 falls below the pressing force in the second direction by the spring 104$s$, the spool 104$p$ is moved in the second direction to reduce the amount of opening of communication between the output port 104$e$ and the discharge port 104$d$ and to increase the amount of opening of communication between the output port 104$e$ and the input port 104$i$. This reduces the amount of oil at the first oil chamber hydraulic pressure 103 to be drained from the discharge port 104$d$ and increases the amount of oil at the first line pressure 131 to be supplied from the input port 104$i$ to the output port 104$e$, which varies the variation rate of the first oil chamber hydraulic pressure 103 such that the first oil chamber hydraulic pressure 103 is increased.

Hence, the first hydraulic pressure control valve 104 regulates the first oil chamber hydraulic pressure 103 in a feedback manner by increasing and decreasing the amount of opening of communication with the discharge port 104$d$ and the amount of opening of communication with the input port 104$i$ through movement of the spool 104$p$ such that the pressing force in the first direction by the first oil chamber hydraulic pressure 103 and the pressing force in the second direction by the spring 104$s$ are balanced against each other. Oil at the first oil chamber hydraulic pressure 103 regulated by the first hydraulic pressure control valve 104 is fed to the first oil chamber 102 of the first engagement device C1. In addition, oil drained from the discharge port 104$d$ is fed to the oil reserving portion OT or the suction port of the hydraulic pump OP. As with the second hydraulic pressure control valve 114, a type of a pressure regulation valve (pressure reduction valve) that only opens and closes an oil passage to a drain may also be used as the first hydraulic pressure control valve 104.

In addition, as described above, the first hydraulic pressure control valve 104 controls the first oil chamber hydraulic pressure 103 so as to cause the first oil chamber 102 to generate a back pressure that presses the first piston 106 in such a direction that the first friction members 101 are disengaged with a load higher than the initial engagement load by the first urging mechanism 107. The hydraulic pressure in the first oil chamber 102 is fluctuated with respect to the first oil chamber hydraulic pressure 103 controlled by the first hydraulic pressure control valve 104 because of various fluctuation factors. Examples of the fluctuation factors include static factors such as the conduit resistance of an oil passage from the first hydraulic pressure control valve 104 to the first oil chamber 102, the oil temperature, the line temperature, and the rotational speed of members, dynamic factors such as fluctuations in the oil temperature, the line pressure, and the rotational speed of members, and mechanical variations such as variations in the hydraulic control valve and conduit resistances. Even if maximum fluctuations in hydraulic pressure are caused by such fluctuation factors, the first hydraulic pressure control valve 104 controls the first oil chamber hydraulic pressure 103 so as to cause the first oil chamber 102 to generate a back pressure that presses the first piston 106 in such a direction that the first friction members 101 are disengaged with a load higher than the initial engagement load applied by the first urging mechanism 107. In the embodiment, the first hydraulic pressure control valve 104 is configured to control the first oil chamber hydraulic pressure 103 such that the first oil chamber hydraulic pressure 103 is a predetermined hydraulic pressure determined in consideration of the range of maximum fluctuations in hydraulic pressure due to such fluctuation factors. In the first hydraulic pressure control valve 104 in the example shown in FIG. 2, the first oil chamber hydraulic pressure 103 is adjusted so as to meet the conditions described above in accordance with design specifications such as the load of the spring 104s of the first hydraulic pressure control valve 104 and the cross-sectional area of the spool 104p in the feedback pressure chamber 104b.

2-4. Detailed Configuration of First Oil Chamber

Oil at the first oil chamber hydraulic pressure 103 regulated by the first hydraulic pressure control valve 104 is supplied to the first oil chamber 102. The first oil chamber 102 is an oil-tight oil chamber that generates a back pressure of the first hydraulic servo mechanism 100 and that houses the first friction members 101 of the first engagement device C1. In the embodiment, the first hydraulic servo mechanism 100 includes the first cylinder 105, the first piston 106, and the first servo oil chamber 108 which is surrounded by the first cylinder 105 and the first piston 106. The back surface of the first piston 106 serves as a wall surface of the first oil chamber 102, and the first oil chamber hydraulic pressure 103 serves as a back pressure of the first piston 106. In addition, the first oil chamber 102 is configured such that oil supplied to a first supply port 122 of the first oil chamber 102 is circulated through a predetermined path (circulation passage) in the first oil chamber 102 to be discharged from a first discharge port 123 of the first oil chamber 102. The circulation passage of the first oil chamber 102 is configured such that oil flows along the back surface of the first piston 106 and the first friction members 101. The oil supplied to the first oil chamber 102 is circulated in the first oil chamber 102 to generate a back pressure of the first piston 106 and cool the first friction members 101. The oil circulated in the first oil chamber 102 to be discharged from the first discharge port 123 of the first oil chamber 102 is fed to the oil reserving portion OT or the suction port of the hydraulic pump OP via the first orifice portion 120.

2-5. Detailed Configuration of Second Hydraulic Pressure Control Valve

In the embodiment, the second line pressure 141 controlled (regulated) by the second line pressure control valve 140 is supplied to the second hydraulic pressure control valve 114 via a second orifice portion 125. The second orifice portion 125 restricts the amount of oil at the second line pressure 141 to be supplied to the second oil chamber hydraulic pressure 113 side. The second oil chamber hydraulic pressure 113 is regulated with the drain amount of oil supplied at the second line pressure 141 adjusted by the second hydraulic pressure control valve 114. In the example, a type of a pressure regulation valve (pressure reduction valve) that includes a spool 114p, a spring 114s that urges the spool 114p, and so forth and that only opens and closes an oil passage to a drain is used as the second hydraulic pressure control valve 114. That is, the second hydraulic pressure control valve 114 regulates the second oil chamber hydraulic pressure 113 by further reducing the second line pressure 141 by adjusting the drain amount of oil in accordance with the balance between the pressing force with which the spool 114p is pressed in the second direction (upward in FIG. 2) by the spring 114s and the pressing force with which the spool 114p is pressed in the first direction (downward in FIG. 2) by the second oil chamber hydraulic pressure 113 supplied to an input port 114a.

Specifically, in the case where the pressing force in the first direction by the second oil chamber hydraulic pressure 113 exceeds the pressing force in the second direction by the spring 114s, the spool 114p is moved in the first direction to increase the amount of opening of communication between the input port 114a to which oil at the second oil chamber hydraulic pressure 113 is supplied and a discharge port 114b and to increase the amount of oil at the second oil chamber hydraulic pressure 113 to be drained from the discharge port 114b. This varies the variation rate of the second oil chamber hydraulic pressure 113 such that the second oil chamber hydraulic pressure 113 is reduced. Conversely, in the case where the pressing force in the first direction by the second oil chamber hydraulic pressure 113 falls below the pressing force in the second direction by the spring 114s, the spool 114p is moved in the second direction to reduce the amount of opening of communication between the input port 114a and the discharge port 114b and to decrease the amount of oil at the second oil chamber hydraulic pressure 113 to be drained from the discharge port 114b. This varies the variation rate of the second oil chamber hydraulic pressure 113 such that the second oil chamber hydraulic pressure 113 is increased.

Hence, the second hydraulic pressure control valve 114 regulates the second oil chamber hydraulic pressure 113 in a feedback manner by increasing and decreasing the amount of opening of communication with the discharge port 114b through movement of the spool 114p such that the pressing force in the first direction by the second oil chamber hydraulic pressure 113 and the pressing force in the second direction by the spring 114s are balanced against each other. Oil at the second oil chamber hydraulic pressure 113 regulated by the second hydraulic pressure control valve 114 is fed to the second oil chamber 112 of the second engagement device C2. In addition, oil drained from the discharge port 114b is fed to the oil reserving portion OT or the suction port of the hydraulic pump OP. As with the first hydraulic pressure control valve 104, a type of a pressure regulation valve (pressure reduction valve) that opens and closes an oil passage from a source pressure and opens and closes an oil passage to a drain at the same time may also be used as the second hydraulic pressure control valve 114.

2-6. Detailed Configuration of Second Oil Chamber

Oil at the second oil chamber hydraulic pressure 113 regulated by the second hydraulic pressure control valve 114 is supplied to the second oil chamber 112. The second oil chamber 112 is an oil-tight oil chamber that generates a back pressure of the second hydraulic servo mechanism 110. The second friction members 111 of the second engagement device C2 and the pump impeller 41 and the turbine runner 51 of the torque converter TC are housed in the second oil chamber 112. In the embodiment, the second hydraulic servo mechanism 110 includes the second cylinder 115, the second piston 116, and the second servo oil chamber 118 which is surrounded by the second cylinder 115 and the second piston 116. The back surface of the second piston 116 serves as a wall surface of the second oil chamber 112, and the second oil chamber hydraulic pressure 113 serves as a back pressure of the second piston 116. In addition, the second oil chamber 112 is configured such that oil supplied to a second supply port 127 of the second oil chamber 112 is circulated through a predetermined path (circulation passage) in the second oil chamber 112 to be discharged from a second discharge port 128 of the second oil chamber 112. The circulation passage of the second oil chamber 112 is configured such that oil flows along the back surface of the second piston 116, the second friction members 111, the pump impeller 41, and the turbine runner 51. The oil supplied to the second oil chamber 112 is circulated in the second oil chamber 112 to generate a back pressure of the second piston 116 and cool the second friction members 111, and supplied as working oil for the pump impeller 41 and the turbine runner 51. The oil circulated in the second oil chamber 112 to be discharged from the second discharge port 128 of the second oil chamber 112 is fed to the oil reserving portion OT or the suction port of the hydraulic pump OP.

2-7. Detailed Configuration of First Servo Hydraulic Pressure Control Valve

In the embodiment, the first line pressure 131 controlled (regulated) by the first line pressure control valve 130 is supplied to the first servo hydraulic pressure control valve 109. A linear solenoid valve that is a hydraulic control valve that have a combination of respective functions of a solenoid and a pressure regulation valve (pressure reduction valve) is used as the first servo hydraulic pressure control valve 109. The first servo hydraulic pressure control valve 109 generates a first servo hydraulic pressure 121 by controlling the amount by which the supplied first line pressure 131 is reduced in accordance with the drive force of the solenoid. Specifically, the first servo hydraulic pressure control valve 109 regulates the first servo hydraulic pressure 121 by further reducing the first line pressure 131 by adjusting the supply amount of oil at the first line pressure 131 supplied from an input port 109$i$ and the drain amount of oil at the first servo hydraulic pressure 121 discharged from a discharge port 109$d$ in accordance with the balance between the pressing force with which a spool is pressed by a spring and the drive force of the solenoid (not shown) and the pressing force with which the spool is pressed by the first servo hydraulic pressure 121 supplied to a feedback pressure chamber 109$b$. A duty solenoid valve and a pressure regulation valve (pressure reduction valve) having the function of a solenoid and the function of a pressure regulation valve (pressure reduction valve), respectively, may also be used as the first servo hydraulic pressure control valve 109.

Hence, in the embodiment, the hydraulic pressure to be supplied to the first oil chamber 102 and the first servo oil chamber 108 of the first engagement device C1 is regulated by reducing the first line pressure 131, and the first oil chamber hydraulic pressure 103 and the first servo hydraulic pressure 121 can be reached quickly after drive of the hydraulic pump OP is started as described above. Hence, it is possible to generate a back pressure of the first hydraulic servo mechanism 100 and control the hydraulic pressure to be supplied to the first servo oil chamber 108 quickly after drive of the hydraulic pump OP is started, which quickly secures the operation accuracy of the first engagement device C1.

In particular, in the case where the first engagement device C1 includes the first urging mechanism 107 which urges the first friction members 101 in such a direction that the first friction members 101 are engaged, a back pressure of the first hydraulic servo mechanism 100 can be reached to release engagement of the first engagement device C1 due to the first urging mechanism 107 quickly after drive of the hydraulic pump OP is started.

2-8. Detailed Configuration of Second Servo Hydraulic Pressure Control Valve In the embodiment, the second line pressure 141 controlled (regulated) by the second line pressure control valve 140 is supplied to the second servo hydraulic pressure control valve 119. As with the first servo hydraulic pressure control valve 109, a linear solenoid valve that is a hydraulic control valve that have a combination of respective functions of a solenoid and a pressure regulation valve (pressure reduction valve) is used as the second servo hydraulic pressure control valve 119. The second servo hydraulic pressure control valve 119 generates a second servo hydraulic pressure 126 by controlling the amount by which the supplied second line pressure 141 is reduced in accordance with the drive force of the solenoid. Specifically, the second servo hydraulic pressure control valve 119 regulates the second servo hydraulic pressure 126 by further reducing the second line pressure 141 by adjusting the supply amount of oil at the second line pressure 141 supplied from an input port 119$i$ and the drain amount of oil at the second servo hydraulic pressure 126 discharged from a discharge port 119$d$ in accordance with the balance between the pressing force with which a spool is pressed by a spring and the drive force of the solenoid (not shown) and the pressing force with which the spool is pressed by the second servo hydraulic pressure 126 supplied to a feedback pressure chamber 119$b$. A duty solenoid valve and a pressure regulation valve (pressure reduction valve) having the function of a solenoid and the function of a pressure regulation valve (pressure reduction valve), respectively, may also be used as the second servo hydraulic pressure control valve 119.

Hence, in the embodiment, the hydraulic pressure to be supplied to the second oil chamber 112 and the second servo oil chamber 118 of the second engagement device C2 is regulated by reducing the second line pressure 141, and the second oil chamber hydraulic pressure 113 and the second servo hydraulic pressure 126 can be generated using the second line pressure 141 which is more stable than the first line pressure 131 as described above. Hence, it is possible to stably generate a back pressure of the second hydraulic servo mechanism 110, and to stably control the hydraulic pressure to be supplied to the second servo oil chamber 118, which stably secures the operation accuracy of the second engagement device C2.

In particular, in the case where the second engagement device C2 includes the second urging mechanism 117 which presses the second friction members 111 in such a direction that the second friction members 111 are disengaged, it is not necessary to release engagement of the second engagement device C2 due to an urging mechanism after drive of the hydraulic pump OP is started unlike the first engagement device C1. Therefore, the second engagement device C2 can be operated stably after drive of the hydraulic pump OP is started also by using the second line pressure 141.

3. Configuration of Various Components of Drive Device

Figure 4:
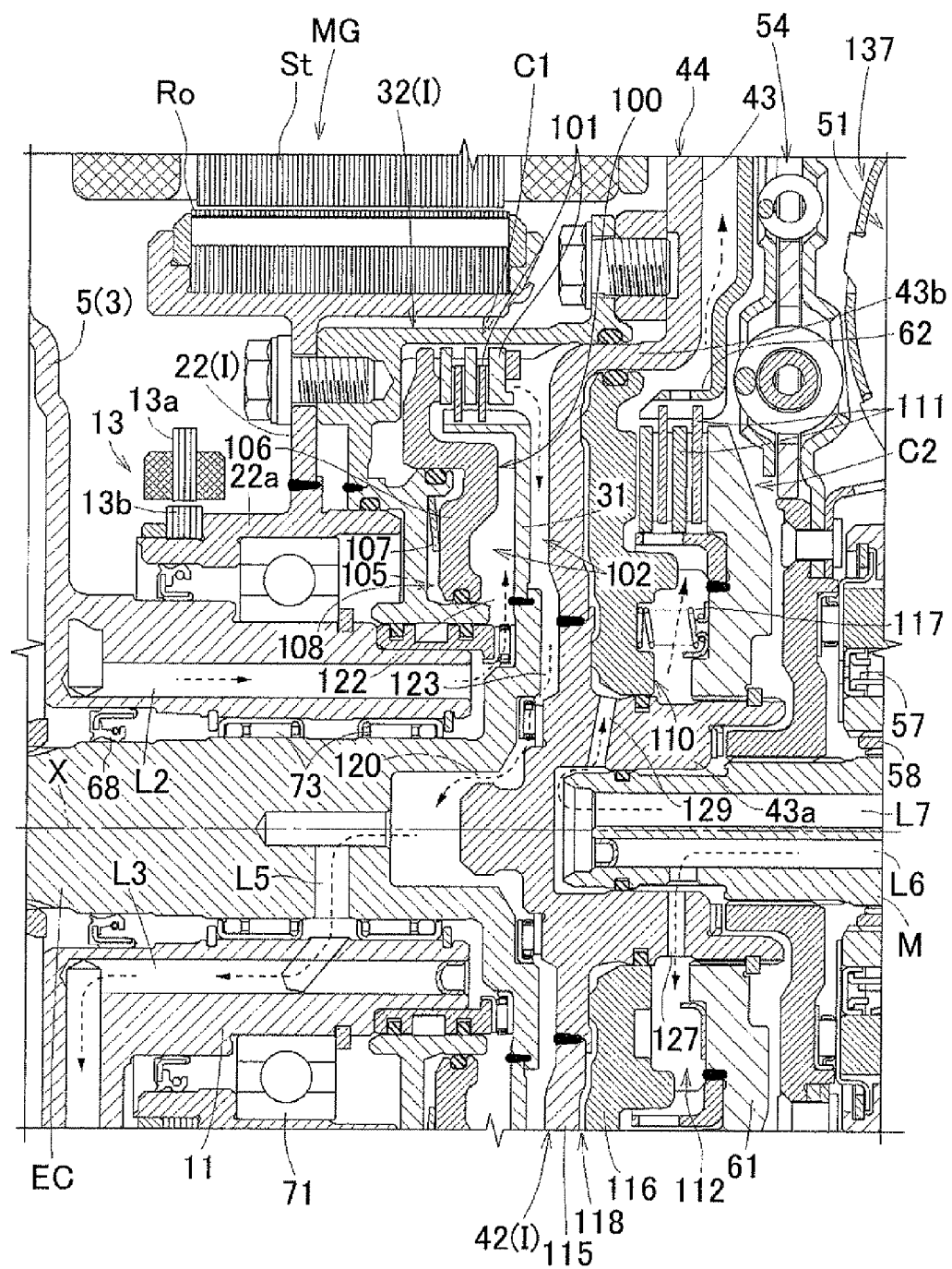
FIG. 4 is a cross-sectional view of the vehicle drive device according to the embodiment of the present invention.

Next, the configuration of various components of the drive device 1 according to the embodiment will be described in detail with reference to FIGS. 3 and 4. FIG. 4 is a partial enlarged view of the cross-sectional view of FIG. 3.

3-1. Case

As shown in FIG. 3, the case 3 generally includes a cylindrical peripheral wall 4, an end-portion support wall 5 provided on the left side in FIG. 3 (internal combustion engine IE side) with respect to the rotary electric machine MG in the axial direction, a tubular projecting portion 11 that projects in the axial direction from the radially central portion of the end-portion support wall 5, and an intermediate partition wall 6 provided on the right side in FIG. 3 (transmission device TM side) with respect to the torque converter TC in the axial direction. The rotary electric machine MG, the first engagement device C1, and the torque converter TC are housed in a space in the case 3 between the end-portion support wall 5 and the intermediate partition wall 6. In addition, the transmission device TM is housed in a space on the right side in FIG. 3 with respect to the intermediate partition wall 6, although not shown. The internal combustion engine IE is provided on the left side in FIG. 3 with respect to the end-portion support wall 5.

The end-portion support wall 5 is shaped to extend at least in the radial direction. Here, the end-portion support wall 5 is a generally flat disk-like wall portion that extends in the radial direction and the circumferential direction. In addition, the tubular projecting portion 11 which projects toward the torque converter TC in the axial direction is provided at the radially central portion of the end-portion support wall 5. In the example, the tubular projecting portion 11 is formed as a cylindrical boss portion that projects from a radially inner end portion of the end-portion support wall 5 toward the torque converter TC. A through hole that penetrates in the axial direction is formed at the radially central portion of the tubular projecting portion 11, and the internal combustion engine coupling shaft EC is inserted through the through hole. In the embodiment, third bearings 73 are disposed between the inner peripheral surface of the tubular projecting portion 11 and the internal combustion engine coupling shaft EC. The internal combustion engine coupling shaft EC is supported by the third bearings 73 so as to be rotatable with respect to the case 3. In the embodiment, needle bearings are used as the third bearings 73. A space between the inner peripheral surface of the tubular projecting portion 11 and the internal combustion engine coupling shaft EC is lidded by an annular oil seal 68 in an oil-tight manner on the internal combustion engine IE of the space.

In the embodiment, a plurality of oil passages are formed in the tubular projecting portion 11. Specifically, as shown in FIGS. 3 and 4, the tubular projecting portion 11 is formed with a second oil passage L2 through which oil regulated by the first hydraulic pressure control valve 104 is fed to the first oil chamber 102, and a third oil passage L3 through which oil discharged from the first oil chamber 102 is fed to the oil reserving portion OT or the suction port of the hydraulic pump OP. In addition, the tubular projecting portion 11 is also formed with a first oil passage through which oil regulated by the first servo hydraulic pressure control valve 109 (see FIG. 2) is fed to the first servo oil chamber 108 and through which oil discharged from the first servo oil chamber 108 is fed to the first servo hydraulic pressure control valve 109, although not shown.

The intermediate partition wall 6 is shaped to extend at least in the radial direction. Here, the intermediate partition wall 6 is a generally flat disk-like wall portion that extends in the radial direction and the circumferential direction. In the embodiment, in addition, the intermediate partition wall 6 is formed as a member separate from the peripheral wall 4, and fastened to a stepped portion formed on the inner peripheral surface of the peripheral wall 4 by fastening members such as bolts. The intermediate partition wall 6 is provided with the hydraulic pump OP. Here, a hydraulic pump cover 7 is attached to a surface of the intermediate partition wall 6 on the torque converter TC side. A hydraulic pump chamber that houses a hydraulic pump rotor is formed between the intermediate partition wall 6 and the hydraulic pump cover 7. The hydraulic pump rotor and the hydraulic pump chamber form the hydraulic pump OP. The hydraulic pump cover 7 is brought into abutment with the intermediate partition wall 6 from the torque converter TC side to be fastened to the intermediate partition wall 6 by fastening members such as bolts. A through hole that penetrates in the axial direction is formed at the radially central portion of the intermediate partition wall 6 and the hydraulic pump cover 7, and the intermediate shaft M is inserted through the through hole. In addition, a hydraulic pump drive shaft 47 and a stator support shaft 58 are also inserted through the through hole. The hydraulic pump drive shaft 47 is a cylindrical shaft portion that rotates together with a cover portion 42 of the torque converter TC, and is disposed radially outwardly of the intermediate shaft M and drivably coupled to the hydraulic pump rotor. The stator support shaft 58 is a cylindrical shaft portion fixed to the intermediate partition wall 6 to support the stator 56 of the torque converter TC, and is disposed between the intermediate shaft M and the hydraulic pump drive shaft 47 in the radial direction. In addition, the intermediate partition wall 6 and the hydraulic pump cover 7 are formed with a first suction oil passage L8 and a first discharge oil passage L9 of the hydraulic pump OP. In addition, as partially shown in FIG. 3, oil passages for supply of oil are provided inside the peripheral wall 4, the end-portion support wall 5, and the intermediate partition wall 6 of the case 3 and the various shafts.

The hydraulic pump rotor of the hydraulic pump OP is drivably coupled to the hydraulic pump drive shaft 47 through spline engagement or the like. Hence, the hydraulic pump rotor is configured to rotate together with the pump impeller 41 of the torque converter TC and the rotor Ro of the rotary electric machine MG. In the embodiment, the hydraulic pump OP is an internal gear pump having an inner rotor and an outer rotor as the hydraulic pump rotor. In addition, the hydraulic pump OP is disposed coaxially with the rotary electric machine MG, the torque converter TC, and the transmission device TM, and the inner rotor is coupled at its radially central portion so as to rotate together with the pump impeller 41 of the torque converter TC. Thus, as the pump impeller 41 rotates, the hydraulic pump OP discharges oil to generate a hydraulic pressure and supply the generated hydraulic pressure to the hydraulic control device.

As shown in FIG. 2, the hydraulic pump OP sucks oil from the oil reserving portion OT via a strainer (not shown) and the first suction oil passage L8, and discharges the oil to the first discharge oil passage L9. The oil discharged from the hydraulic pump OP is fed to the first line pressure control valve 130 via the first discharge oil passage L9. The first line pressure control valve 130 regulates an output pressure of the hydraulic pump OP as the first line pressure 131. Hence, the hydraulic pressure in each oil passage in communication with the discharge port of the hydraulic pump OP such as the first discharge oil passage L9 is regulated by the first line pressure control valve 130 as the first line pressure 131. In the hydraulic control system shown in FIG. 2, oil at the first line pressure 131 is supplied to the first hydraulic pressure control valve 104 and the first servo hydraulic pressure control valve 109.

3-2. Rotary Electric Machine

As shown in FIG. 3, the rotary electric machine MG is disposed on the internal combustion engine IE side (left side in FIG. 3) with respect to the torque converter TC. In the embodiment, the rotary electric machine MG is disposed between the end-portion support wall 5 and the torque converter TC in the axial direction. In addition, the rotary electric machine MG is disposed radially outwardly of the internal combustion engine coupling shaft EC and the first engagement device C1. The stator St of the rotary electric machine MG is fixed to the case 3. The rotor Ro is rotatably supported by the case 3. In addition, the rotor Ro is coupled so as to rotate together with the pump impeller 41 and the cover portion 42 of the torque converter TC via a rotor support member 22. The rotor support member 22 is a member that extends at least in the radial direction to support the rotor Ro. In the embodiment, a cylindrical boss portion 22a is provided at a radially inner end portion of the rotor support member 22, and a first bearing 71 is disposed between the inner peripheral surface of the boss portion 22a and the tubular projecting portion 11 of the case 3. The rotor Ro and the rotor support member 22 are supported by the first bearing 71 so as to be rotatable with respect to the case 3. In the embodiment, a ball bearing is used as the first bearing 71. In addition, a rotation sensor 13 is disposed between the rotor support member 22 and the end-portion support wall 5 in the axial direction and radially outwardly of the boss portion 22a. The rotation sensor 13 is a sensor that detects the rotational position of the rotor Ro of the rotary electric machine MG. A resolver or the like may be suitably used as the rotation sensor 13. Here, a sensor stator 13a of the rotation sensor 13 is fixed to the end-portion support wall 5, and a sensor rotor 13b of the rotation sensor 13 is fixed to the boss portion 22a of the rotor support member 22 (see FIG. 4).

3-3. First Engagement Device

As shown in FIG. 3, the first engagement device C1 is disposed radially inwardly of the rotary electric machine MG and at a position at which the first engagement device C1 partially overlaps the rotary electric machine MG as seen in the radial direction of the rotary electric machine MG. In addition, the first engagement device C1 is disposed on the torque converter TC side with respect to the rotor support member 22 in the axial direction. The first engagement device C1 is an engagement device that selectively drivably couples the internal combustion engine coupling shaft EC and the rotary electric machine MG and the pump impeller 41 of the torque converter TC. In the embodiment, the first engagement device C1 is formed as a friction engagement device. A first clutch hub 31 that serves as an input-side member of the first engagement device C1 is provided integrally with the internal combustion engine coupling shaft EC. Specifically, the first clutch hub 31 is formed as a disk-like member that is formed integrally with the internal combustion engine coupling shaft EC and that extends radially outward from an end portion of the internal combustion engine coupling shaft EC on the transmission device TM side. In addition, a first engagement device drum 32 that serves as an output-side member of the first engagement device C1 is coupled so as to rotate together with the cover portion 42 of the torque converter TC and the rotor support member 22 of the rotary electric machine MG. Specifically, the first engagement device drum 32 is joined to the inner peripheral surface of the boss portion 22a of the rotor support member 22, and joined to the outer peripheral surface of a stepped portion 43b formed on a radially intermediate portion of the cover portion 42 of the torque converter TC. The first engagement device drum 32 serves as both a housing and a cylinder of the first engagement device C1, and houses therein the first clutch hub 31, the first piston 106, the first friction members 101, and so forth. A joint portion between the first engagement device drum 32 and other members is tightly sealed to seal a space inside the first engagement device drum 32 in an oil-tight manner so that oil inside the first engagement device drum 32 does not leak out.

As shown in FIG. 4, the first servo oil chamber 108 provided in the first hydraulic servo mechanism 100 of the first engagement device C1 is surrounded by the first engagement device drum 32 which functions as the first cylinder 105 and the first piston 106. The first servo oil chamber 108 is formed in an oil-tight manner by a seal material. In addition, the first oil chamber 102 of the first engagement device C1 houses the first friction members 101 of the first engagement device C1 etc., and is formed in an oil-tight manner. The first oil chamber 102 generates a back pressure of the first hydraulic servo mechanism 100.

In the embodiment, an end surface of the first piston 106 on the internal combustion engine IE side serves as a piston inner side surface (inner surface) of the first servo oil chamber 108. In addition, an end surface of the first piston 106 on the transmission device TM side serves as an inner surface of the first oil chamber 102 and a piston outer side surface (back surface) of the first servo oil chamber 108. Therefore, the hydraulic pressure in the first oil chamber 102 serves as a back pressure of the first piston 106, and presses the first piston 106 toward the internal combustion engine IE, that is, in such a direction that the first engagement device C1 is disengaged, with a force obtained by multiplying the hydraulic pressure in the first oil chamber 102 and the cross-sectional area of the first cylinder 105. In addition, the first urging mechanism 107 is provided between the first cylinder 105 and the first engagement device drum 32 which serves as the first piston 106, and presses the first piston 106 toward the transmission device TM, that is, in such a direction that the first engagement device C1 is engaged. In the embodiment, the first urging mechanism 107 is a disk spring. The first urging mechanism 107 may be a spring other than the disk spring, and may be a coil spring, for example. In addition, the hydraulic pressure in the first servo oil chamber 108 presses the first piston 106 toward the transmission device TM, that is, in such a direction that the first engagement device C1 is engaged, with a force obtained by multiplying the hydraulic pressure in the first servo oil chamber 108 and the cross-sectional area of the first cylinder 105. Hence, the first engagement device C1 is engaged and disengaged in accordance with the balance between the pressing force for the first piston 106 by the hydraulic pressure in the first servo oil chamber 108 and the first urging mechanism 107 and the pressing force of the first piston 106 by the hydraulic pressure in the first oil chamber 102.

As described above, the first oil chamber 102 is configured such that oil supplied to the first supply port 122 of the first oil chamber 102 is circulated through a predetermined path (circulation passage) in the first oil chamber 102 to be discharged from the first discharge port 123 of the first oil chamber 102. In the embodiment, the first supply port 122 of the first oil chamber 102 is formed by a gap between the first clutch hub 31 and a radially inner end portion of the first engagement device drum 32. Oil regulated by the first hydraulic pressure control valve 104 is fed through the peripheral wall 4 and the end-portion support wall 5 of the case 3 and the second oil passage L2 provided in the wall surface of the tubular projecting portion 11 to be supplied to the first oil chamber 102 from the first supply port 122. The oil supplied to the first supply port 122 flows radially outward through a space (circulation passage) which is formed between the first piston 106 and the first clutch hub 31 and extends in the radial direction. The oil which has flowed radially outward flows through a gap (circulation passage) formed along the plurality of first friction members 101. In this event, the first friction members 101 are cooled. After that, the oil which has flowed along the first friction members 101 flows radially inward through a space (circulation passage) which is formed between the first clutch hub 31 and a first cover member 43 of the torque converter TC and extends in the radial direction. Oil is discharged from the first discharge port 123 of the first oil chamber 102. The first discharge port 123 is a radially inner portion of the space formed between the first clutch hub 31 and the first cover member 43. A gap with a narrow clearance (that is narrowed) in the space formed between the first clutch hub 31 and the first cover member 43 corresponds to the first orifice portion 120, and serves as an orifice. Because the first oil chamber 102 is narrowed on the discharge side, the hydraulic pressure in the first oil chamber 102 is made uniform as described above.

The oil discharged from the first discharge port 123 of the first oil chamber 102 sequentially flows through an oil-tight space between the internal combustion engine coupling shaft EC and the first cover member 43, a fifth oil passage L5 provided in the internal combustion engine coupling shaft EC, an oil-tight gap between the internal combustion engine coupling shaft EC and the tubular projecting portion 11 of the case 3, the third oil passage L3 provided in the tubular projecting portion 11 and the end-portion support wall 5 of the case 3, a tubular member 96c, and a tenth oil passage L10 provided in the peripheral wall 4 to be fed from the first oil chamber 102 to the oil reserving portion OT or the suction port of the hydraulic pump OP (see FIG. 3).

Oil regulated by the first servo hydraulic pressure control valve 109 is fed through the peripheral wall 4 and the end-portion support wall 5 of the case 3 and a supply oil passage (not shown) provided in the wall surface of the tubular projecting portion 11 to be supplied to the first servo oil chamber 108 from a first supply/discharge port 124 (see FIG. 2).

3-4. Torque Converter

As shown in FIG. 3, the torque converter TC is disposed between the rotary electric machine MG and the transmission device TM in the axial direction. The torque converter TC includes the pump impeller 41, the turbine runner 51, the stator 56, and the cover portion 42 which houses such components. In the embodiment, in addition, the second engagement device C2 and a damper 54 are also housed in the cover portion 42. The cover portion 42 is configured to rotate together with the pump impeller 41. Here, the pump impeller 41 is integrally formed inside the cover portion 42.

In the embodiment, the cover portion 42 is formed by joining the first cover member 43 on the rotary electric machine MG side thereof and a second cover member 44 on the transmission device TM side thereof to each other. The first cover member 43 is a cylindrical member formed to cover the rotary electric machine MG side of the torque converter TC. In the example, the first cover member 43 is formed as a stepped cylindrical member formed with the stepped portion 43b at its radially intermediate portion. The inner peripheral surface of the first engagement device drum 32 is joined to the outer peripheral surface of the stepped portion 43b. This allows the cover portion 42 to be coupled so as to rotate together with the first engagement device drum 32 of the first engagement device C1. In addition, the second engagement device C2 is housed radially inwardly of the stepped portion 43b. As shown in FIG. 3, the second cover member 44 is a cover member formed to cover the transmission device TM side of the torque converter TC. In the example, the second cover member 44 is formed as an annular member having an arcuate cross-sectional shape with its radially intermediate portion swelled toward the transmission device TM. The hydraulic pump drive shaft 47 which extends toward the transmission device TM in the axial direction is provided integrally with a radially inner end portion of the second cover member 44. The hydraulic pump drive shaft 47 is a cylindrical shaft portion that rotates together with the cover portion 42 of the torque converter TC, and is disposed radially outwardly of the intermediate shaft M and coaxially with the intermediate shaft M. A second bearing 72 is disposed between the outer peripheral surface of the hydraulic pump drive shaft 47 and the inner peripheral surface of the through hole of the hydraulic pump cover 7. The hydraulic pump drive shaft 47 and the cover portion 42 of the torque converter TC are supported by the second bearing 72 so as to be rotatable with respect to the case 3. In the embodiment, a needle bearing is used as the second bearing 72. An end portion of the hydraulic pump drive shaft 47 on the transmission device TM side is coupled so as to rotate together with the hydraulic pump rotor of the hydraulic pump OP. Here, the hydraulic pump drive shaft 47 and the hydraulic pump rotor are coupled to each other through spline engagement.

The first cover member 43 and the second cover member 44 are integrally joined to each other by welding or the like. When the drive device 1 is seen as a whole, the cover portion 42 of the torque converter TC, the rotor support member 22, and the first engagement device drum 32 of the first engagement device C1 form a combined body of a plurality of members coupled so as to rotate together, and the combined body forms the input shaft I. The input shaft I is supported via the first bearing 71 on the internal combustion engine coupling shaft EC side so as to be rotatable with respect to the case 3, and supported via the second bearing 72 on the transmission device TM side so as to be rotatable with respect to the case 3. In addition, the input shaft I is joined so as to rotate together with the rotor Ro of the rotary electric machine MG and the pump impeller 41.

The turbine runner 51 of the torque converter TC is disposed inside the cover portion 42 on the rotary electric machine MG side with respect to the pump impeller 41 to face the pump impeller 41. The turbine runner 51 is coupled so as to rotate together with the input shaft I. Here, a radially inner end portion of the turbine runner 51 is splined-engaged with the intermediate shaft M. The stator 56 of the torque converter TC is disposed between the pump impeller 41 and the turbine runner 51 in the axial direction. The stator 56 is supported by the stator support shaft 58 via the one-way clutch 57. As described above, the stator support shaft 58 is a cylindrical shaft portion, and is fixed to the intermediate partition wall 6 on the transmission device TM side. The torque converter TC can transfer torque between the pump impeller 41 on the driving side and the turbine runner 51 on the driven side via oil filling the inside of the cover portion 42.

The damper 54 is disposed between the second engagement device C2 and the turbine runner 51 in the axial direction. The damper 54 is provided to absorb vibration in a drive force transferred between the pump impeller 41 and the turbine runner 51 with the second engagement device C2 in the engaged state. In the embodiment, the damper 54 includes an input-side member 54a and an output-side member 54b configured to be movable relative to each other in the circumferential direction, a spring 54c for vibration absorption provided between the input-side member 54a and the output-side member 54b, and so forth. The input-side member 54a of the damper 54 is coupled so as to rotate together with a second engagement device drum 62 of the second engagement device C2. In addition, the output-side member 54b of the damper 54 is coupled so as to rotate together with the turbine runner 51 and the intermediate shaft M.

3-5. Second Engagement Device

As shown in FIG. 3, the second engagement device C2 is disposed radially inwardly of the stepped portion 43b of the cover portion 42, and on the rotary electric machine MG side with respect to the turbine runner 51 in the axial direction. The second engagement device C2 is an engagement device that directly couples the pump impeller 41 and the turbine runner 51 to each other (lock-up state) with transfer of a drive force via oil blocked, by engaging the pump impeller 41 and the turbine runner 51 with each other. In the embodiment, the second engagement device C2 is formed as a friction engagement device. A second clutch hub 61 that serves as an input-side member of the second engagement device C2 is provided so as to rotate together with the cover portion 42. Specifically, the second clutch hub 61 is coupled on its radially inner side to a support cylindrical portion 43*a* of the first cover member 43 of the cover portion 42 through spline engagement. In addition, the second engagement device drum 62 which serves as an output-side member of the second engagement device C2 is drivably coupled to the turbine runner 51 and the intermediate shaft M via the damper 54. Specifically, the second engagement device drum 62 is formed integrally with the input-side member 54*a* of the damper 54. The second piston 116, the second friction members 111, and so forth of the second engagement device C2 are also housed in a space formed radially inwardly of the stepped portion 43*b*. In the embodiment, in addition, the second engagement device C2 is disposed across the first cover member 43 from the first engagement device C1 in the axial direction.

The first cover member 43 serves as both a housing and a cylinder of the second engagement device C2, and houses therein the second clutch hub 61, the second piston 116, the second friction members 111, and so forth.

As shown in FIG. 4, the second servo oil chamber 118 provided in the second hydraulic servo mechanism 110 of the second engagement device C2 is surrounded by the first cover member 43 which functions as the second cylinder 115 and the second piston 116. The second servo oil chamber 118 is formed in an oil-tight manner by a seal material. In addition, the second oil chamber 112 of the second engagement device C2 houses the second friction members 111 of the second engagement device C2 etc., and is formed in an oil-tight manner. The second oil chamber 112 generates a back pressure of the second hydraulic servo mechanism 110.

In the embodiment, an end surface of the second piston 116 on the internal combustion engine IE side serves as a piston inner side surface of the second servo oil chamber 118. In addition, an end surface of the second piston 116 on the transmission device TM side serves as an inner surface of the second oil chamber 112 and a piston outer side surface of the second servo oil chamber 118. Therefore, the hydraulic pressure in the second oil chamber 112 serves as a back pressure of the second piston 116, and presses the second piston 116 toward the internal combustion engine IE, that is, in such a direction that the second engagement device C2 is disengaged, with a force obtained by multiplying the hydraulic pressure in the second oil chamber 112 and the cross-sectional area of the second cylinder 115. In addition, the second urging mechanism 117 is provided between the second cylinder 115 and the second clutch hub 61, and presses the second piston 116 toward the internal combustion engine IE, that is, in such a direction that the second engagement device C2 is disengaged. In the embodiment, the second urging mechanism 117 is a coil spring. The second urging mechanism 117 may be a spring other than the coil spring, and may be a disk spring, for example. In addition, the hydraulic pressure in the second servo oil chamber 118 presses the second piston 116 toward the transmission device TM, that is, in such a direction that the second engagement device C2 is engaged, with a force obtained by multiplying the hydraulic pressure in the second servo oil chamber 118 and the cross-sectional area of the second cylinder 115. Hence, the second engagement device C2 is engaged and disengaged in accordance with the balance between the pressing force for the second piston 116 by the hydraulic pressure in the second servo oil chamber 118 and the pressing force for the second piston 116 by the hydraulic pressure in the second oil chamber 112 and the second urging mechanism 117.

As described above, the second oil chamber 112 is configured such that oil supplied to the second supply port 127 of the second oil chamber 112 is circulated through a predetermined path (circulation passage) in the second oil chamber 112 to be discharged from the second discharge port 128 (see FIG. 3) of the second oil chamber 112. In the embodiment, the second supply port 127 of the second oil chamber 112 is formed in the support cylindrical portion 43*a* provided at a radially inner side portion of the first cover member 43.

Here, the support cylindrical portion 43*a* is a cylindrical portion disposed coaxially with an axis X and formed to extend toward the transmission device TM in the axial direction. The outer peripheral surface of the support cylindrical portion 43*a* forms a radially inner side surface of the second cylinder 115, and spline-coupled to the second clutch hub 61. The intermediate shaft M is disposed radially inwardly of the support cylindrical portion 43*a*, and an end portion of the intermediate shaft M on the internal combustion engine IE side is rotatably supported by the inner peripheral surface of the support cylindrical portion 43*a*.

Oil regulated by the second hydraulic pressure control valve 114 is fed through a sixth oil passage L6 provided in the intermediate shaft M to be supplied to the second oil chamber 112 from the second supply port 127. The oil supplied to the second supply port 127 flows radially outward through a space (circulation passage) that is formed between the second piston 116 and the second clutch hub 61 and extends in the radial direction. The oil which has flowed radially outward flows through a gap (circulation passage) formed along the plurality of second friction members 111. In this event, the second friction members 111 are cooled. After that, the oil which has flowed along the second friction members 111 flows radially outward through a space (circulation passage) that is formed between the first cover member 43 and the second engagement device drum 62 and extends in the radial direction. After circulating in the cover portion 42 in which the pump impeller 41 and the turbine runner 51 are disposed, the oil is discharged from the second discharge port 128 of the second oil chamber 112 as shown in FIG. 3. The oil discharged from the second discharge port 128 of the second oil chamber 112 flows through an oil passage provided around the intermediate shaft M to be fed to the oil reserving portion OT or the suction port of the hydraulic pump OP.

Oil regulated by the second servo hydraulic pressure control valve 119 is fed through a seventh oil passage L7 provided in the intermediate shaft M to be supplied to the second servo hydraulic pressure 118 from a second supply/discharge port 129.

3-6. Transmission Device

The transmission device TM is disposed on the output shaft O side with respect to the intermediate partition wall 6, that is, on the opposite side (right side in FIG. 3) of the intermediate partition wall 6 from the torque converter TC, although not shown in FIG. 3. In the embodiment, the transmission device TM is a stepped automatic transmission device that provides a plurality of shift speeds with different speed ratios.

4. Other Embodiments

Lastly, other embodiments of the present invention will be described. The configuration of each embodiment described below is not limited to its independent application, and may be applied in combination with the configuration of other embodiments unless any contradiction occurs.

(1) In the embodiment described above, the hydraulic pump OP is formed as a mechanical pump driven by a drive force transferred to the input shaft I. However, the present invention is not limited thereto. That is, the hydraulic pump OP may be formed as an electric pump driven by a pump drive motor that is separate from the internal combustion engine IE and the rotary electric machine MG, or may be formed as a combination of the electric pump and the mechanical pump.

(2) In the embodiment described above, the drive device 1 includes, as the torque converter TC, the pump impeller 41, the turbine runner 51, and the second engagement device C2 which directly couples the pump impeller 41 and the turbine runner 51 to each other. However, the present invention is not limited thereto. That is, the drive device 1 may not include the torque converter TC, and may include, as the second engagement device C2, a friction engagement device that selectively drivably couples the input shaft I and the intermediate shaft M to each other in place of the torque converter TC. In this case as well, the second engagement device C2 includes the second oil chamber 112 which generates a back pressure of the second hydraulic servo mechanism 110 and which houses the second friction members 111 of the second engagement device C2. Then, as in the embodiment described above, the drive device 1 includes the second hydraulic pressure control valve 114 which controls the second oil chamber hydraulic pressure 113 independently of the first oil chamber hydraulic pressure 103.

(3) In the embodiment described above, the second servo oil chamber 118 which is surrounded in an oil-tight manner by the first cover member 43 which functions as the second cylinder 115 and the second piston 116 is provided as the second hydraulic servo mechanism 110 of the second engagement device C2. However, the present invention is not limited thereto. That is, the second servo hydraulic pressure 118 may not be formed in an oil-tight manner, and may be formed integrally with the second oil chamber 112 in communication therewith. In this case, a hydraulic pressure to be supplied to the second servo oil chamber 118 side of the second piston 116 or the side of the second piston 116 opposite to the second servo oil chamber 118 is controlled. Thus, the engagement state of the second engagement device C2 is controlled by controlling the pressing force with which the second piston 116 presses the second friction members 111. That is, in this case, the second oil chamber 112 integrally includes the second servo oil chamber 118 provided in communication with the second oil chamber 112, and the engagement state of the second engagement device C2 is controlled in accordance with the hydraulic pressure to be supplied to the second servo oil chamber 118 side of the second oil chamber 112, or the hydraulic pressure to be supplied to the second oil chamber 112 other than the second servo oil chamber 118.

(4) In the embodiment described above, the first hydraulic pressure control valve 104 is supplied with oil at the first line pressure 131 controlled by the first line pressure control valve 130 and supplies oil at the first oil chamber hydraulic pressure 103 to the first oil chamber 102, and the second hydraulic pressure control valve 114 is supplied with oil at the second line pressure 141 controlled by the second line pressure control valve 140 and supplies oil at the second oil chamber hydraulic pressure 113 to the second oil chamber 112. However, the present invention is not limited thereto. That is, the first hydraulic pressure control valve 104 may be configured to be supplied with oil at the second line pressure 141, and to supply oil at the first oil chamber hydraulic pressure 103 to the first oil chamber 102. In this case, the second hydraulic pressure control valve 114 may be configured to be supplied with oil at the second line pressure 141 or the first line pressure 131, and to supply oil at the second oil chamber hydraulic pressure 113 to the second oil chamber 112. In addition, in the case where the first hydraulic pressure control valve 104 is supplied with oil at the first line pressure 131 and supplies oil at the first oil chamber hydraulic pressure 103 to the first oil chamber 102, the second hydraulic pressure control valve 114 may be configured to be supplied with oil at the first line pressure 131, and to supply oil at the second oil chamber hydraulic pressure 113 to the second oil chamber 112.

(5) In the embodiment described above, the transmission device TM is a stepped automatic transmission device. However, embodiments of the present invention are not limited thereto. That is, in a preferred embodiment of the present invention, the transmission device TM is a transmission device other than the stepped automatic transmission device, such as a continuously variable automatic transmission device capable of continuously changing the speed change ratio.

(6) In the embodiment described above, the drive device 1 includes the first orifice portion 120 which serves as an orifice portion that reduces a flow rate on a discharge oil passage for oil discharged from the first oil chamber 102. However, embodiments of the present invention are not limited thereto. That is, the drive device 1 may be configured not to include an orifice portion that reduces a flow rate on a discharge oil passage for oil discharged from the first oil chamber 102, or may be configured to include an orifice portion that reduces a flow rate at a location other than on the discharge oil passage, such as in the first oil chamber 102 or in a supply oil passage for the first oil chamber 102, for example.

(7) In the embodiment described above, the first engagement device C1 includes the first urging mechanism 107 which urges the first piston 106 with a predetermined initial engagement load such that the first piston 106 presses the first friction members 101 in such a direction that the first friction members 101 are engaged. However, embodiments of the present invention are not limited thereto. That is, the first engagement device C1 may include the first urging mechanism 107 which urges the first piston 106 with a predetermined initial engagement load such that the first piston 106 presses the first friction members 101 in such a direction that the first friction members 101 are disengaged.

(8) In the embodiment described above, the first hydraulic pressure control valve 104 controls the first oil chamber hydraulic pressure 103 so as to cause the first oil chamber 102 to generate a back pressure that presses the first piston 106 in such a direction that the first friction members 101 are disengaged with a load higher than the initial engagement load. However, embodiments of the present invention are not limited thereto. That is, the first hydraulic pressure control valve 104 may control the first oil chamber hydraulic pressure 103 so as to cause the first oil chamber 102 to generate a back pressure that presses the first piston 106 in such a direction that the first friction members 101 are disengaged with a load lower than the initial engagement load.

The present invention may be suitably applied to a vehicle drive device including an input member drivably coupled to a rotary electric machine, an output member drivably coupled to wheels, a first engagement device that selectively drivably couples the input member to an internal combustion engine, and a fluid coupling provided on a power transfer path that connects between the input member and the output member.

The invention claimed is:

1. A vehicle drive device including an input member drivably coupled to a rotary electric machine, an output member drivably coupled to wheels, a first engagement device that selectively drivably couples the input member to an internal combustion engine, and a fluid coupling provided on a power transfer path that connects between the input member and the output member, wherein:
the first engagement device includes a first friction member, a first piston that presses the first friction member, and a first oil chamber that houses the first friction member and that is formed to be supplied with a hydraulic pressure and to apply a hydraulic pressure to a side of the first piston opposite to a side on which a hydraulic pressure for operation is applied;
the fluid coupling includes a second oil chamber that is provided in a body portion housing chamber that houses a body portion of the fluid coupling and that controls an engagement state of a second engagement device in accordance with a hydraulic pressure, the second engagement device being configured to directly couple a coupling input-side member drivably coupled to an input member side of the vehicle drive device and a coupling output-side member drivably coupled to an output member side of the vehicle drive device;
the vehicle drive device comprises a first hydraulic pressure control valve that controls a first oil chamber hydraulic pressure which is a hydraulic pressure to be supplied to the first oil chamber, and a second hydraulic pressure control valve that controls a second oil chamber hydraulic pressure which is a hydraulic pressure to be supplied to the second oil chamber independently of the first oil chamber hydraulic pressure;
the first oil chamber is provided with a circulation passage where oil supplied to a supply port from the first hydraulic pressure control valve flows along the first friction member and is discharged from a discharge port that is different from the supply port; and
the vehicle drive device further comprises an orifice portion that reduces a flow rate, the orifice portion being provided on a discharge oil passage through which a hydraulic pressure supplied from the first hydraulic pressure control valve to the first oil chamber is discharged from the first oil chamber.

2. The vehicle drive device according to claim 1, wherein:
the first engagement device includes an urging mechanism that urges the first piston with a predetermined initial engagement load such that the first piston presses the first friction member in such a direction that the first friction member is engaged; and
the first hydraulic pressure control valve controls the first oil chamber hydraulic pressure so as to cause the first oil chamber to generate a hydraulic pressure that presses the first piston in such a direction that the first friction member is disengaged with a load higher than the initial engagement load irrespective of whether the first engagement device is engaged or disengaged.

3. The vehicle drive device according to claim 2, further comprising:
a first line pressure control valve that controls an output pressure of a hydraulic pump as a first line pressure; and
a second line pressure control valve that controls the first line pressure as a second line pressure by further reducing the first line pressure, wherein:
the first hydraulic pressure control valve is supplied with oil at the first line pressure controlled by the first line pressure control valve, and supplies oil at the first oil chamber hydraulic pressure to the first oil chamber; and
the second hydraulic pressure control valve is supplied with oil at the second line pressure controlled by the second line pressure control valve, and supplies oil at the second oil chamber hydraulic pressure to the second oil chamber.

4. The vehicle drive device according to claim 3, wherein:
the second engagement device includes a second friction member and a second piston that presses the second friction member; and
the second oil chamber houses therein the second friction member and the coupling input-side member and the coupling output-side member of the fluid coupling, and is formed to be supplied with a hydraulic pressure and to apply a hydraulic pressure to a side of the second piston opposite to a side on which a hydraulic pressure for operation is applied.

5. The vehicle drive device according to claim 1, further comprising:
a first line pressure control valve that controls an output pressure of a hydraulic pump as a first line pressure; and
a second line pressure control valve that controls the first line pressure as a second line pressure by further reducing the first line pressure, wherein:
the first hydraulic pressure control valve is supplied with oil at the first line pressure controlled by the first line pressure control valve, and supplies oil at the first oil chamber hydraulic pressure to the first oil chamber; and
the second hydraulic pressure control valve is supplied with oil at the second line pressure controlled by the second line pressure control valve, and supplies oil at the second oil chamber hydraulic pressure to the second oil chamber.

6. The vehicle drive device according to claim 5, wherein:
the second engagement device includes a second friction member and a second piston that presses the second friction member; and
the second oil chamber houses therein the second friction member and the coupling input-side member and the coupling output-side member of the fluid coupling, and is formed to be supplied with a hydraulic pressure and to apply a hydraulic pressure to a side of the second piston opposite to a side on which a hydraulic pressure for operation is applied.

7. The vehicle drive device according to claim 1, wherein:
the second engagement device includes a second friction member and a second piston that presses the second friction member; and
the second oil chamber houses therein the second friction member and the coupling input-side member and the coupling output-side member of the fluid coupling, and is formed to be supplied with a hydraulic pressure and to apply a hydraulic pressure to a side of the second piston opposite to a side on which a hydraulic pressure for operation is applied.

8. The vehicle drive device according to claim 2, wherein:
the second engagement device includes a second friction member and a second piston that presses the second friction member; and
the second oil chamber houses therein the second friction member and the coupling input-side member and the coupling output-side member of the fluid coupling, and is formed to be supplied with a hydraulic pressure and to apply a hydraulic pressure to a side of the second piston opposite to a side on which a hydraulic pressure for operation is applied.

9. A vehicle drive device including an input member drivably coupled to a rotary electric machine, an output member drivably coupled to wheels, a first engagement device that selectively drivably couples the input member to an internal combustion engine, and a fluid coupling provided on a power transfer path that connects between the input member and the output member, wherein:
the first engagement device includes a first friction member, a first piston that presses the first friction member, and a first oil chamber that houses the first friction member and that is formed to be supplied with a hydraulic pressure and to apply a hydraulic pressure to a side of the first piston opposite to a side on which a hydraulic pressure for operation is applied;
the fluid coupling includes a second oil chamber that is provided in a body portion housing chamber that houses a body portion of the fluid coupling and that controls an engagement state of a second engagement device in accordance with a hydraulic pressure, the second engagement device being configured to directly couple a coupling input-side member drivably coupled to an input member side of the vehicle drive device and a coupling output-side member drivably coupled to an output member side of the vehicle drive device;
the vehicle drive device comprises a first hydraulic pressure control valve that controls a first oil chamber hydraulic pressure which is a hydraulic pressure to be supplied to the first oil chamber, and a second hydraulic pressure control valve that controls a second oil chamber hydraulic pressure which is a hydraulic pressure to be supplied to the second oil chamber independently of the first oil chamber hydraulic pressure;
the first oil chamber is provided with a circulation passage where oil supplied to a supply port from the first hydraulic pressure control valve flows along the first friction member and is discharged from a discharge port that is different from the supply port;
the first engagement device includes an urging mechanism that urges the first piston with a predetermined initial engagement load such that the first piston presses the first friction member in such a direction that the first friction member is engaged; and
the first hydraulic pressure control valve controls the first oil chamber hydraulic pressure so as to cause the first oil chamber to generate a hydraulic pressure that presses the first piston in such a direction that the first friction member is disengaged with a load higher than the initial engagement load irrespective of whether the first engagement device is engaged or disengaged,
the vehicle drive device further comprises:
a first line pressure control valve that controls an output pressure of a hydraulic pump as a first line pressure; and
a second line pressure control valve that controls the first line pressure as a second line pressure by further reducing the first line pressure, wherein:
the first hydraulic pressure control valve is supplied with oil at the first line pressure controlled by the first line pressure control valve, and supplies oil at the first oil chamber hydraulic pressure to the first oil chamber; and
the second hydraulic pressure control valve is supplied with oil at the second line pressure controlled by the second line pressure control valve, and supplies oil at the second oil chamber hydraulic pressure to the second oil chamber.

10. A vehicle drive device including an input member drivably coupled to a rotary electric machine, an output member drivably coupled to wheels, a first engagement device that selectively drivably couples the input member to an internal combustion engine, and a fluid coupling provided on a power transfer path that connects between the input member and the output member, wherein:
the first engagement device includes a first friction member, a first piston that presses the first friction member, and a first oil chamber that houses the first friction member and that is formed to be supplied with a hydraulic pressure and to apply a hydraulic pressure to a side of the first piston opposite to a side on which a hydraulic pressure for operation is applied;
the fluid coupling includes a second oil chamber that is provided in a body portion housing chamber that houses a body portion of the fluid coupling and that controls an engagement state of a second engagement device in accordance with a hydraulic pressure, the second engagement device being configured to directly couple a coupling input-side member drivably coupled to an input member side of the vehicle drive device and a coupling output-side member drivably coupled to an output member side of the vehicle drive device;
the vehicle drive device comprises a first hydraulic pressure control valve that controls a first oil chamber hydraulic pressure which is a hydraulic pressure to be supplied to the first oil chamber, and a second hydraulic pressure control valve that controls a second oil chamber hydraulic pressure which is a hydraulic pressure to be supplied to the second oil chamber independently of the first oil chamber hydraulic pressure;
the first oil chamber is provided with a circulation passage where oil supplied to a supply port from the first hydraulic pressure control valve flows along the first friction member and is discharged from a discharge port that is different from the supply port;
the first engagement device includes an urging mechanism that urges the first piston with a predetermined initial engagement load such that the first piston presses the first friction member in such a direction that the first friction member is engaged;
the first hydraulic pressure control valve controls the first oil chamber hydraulic pressure so as to cause the first oil chamber to generate a hydraulic pressure that presses the first piston in such a direction that the first friction member is disengaged with a load higher than the initial engagement load irrespective of whether the first engagement device is engaged or disengaged;
the second engagement device includes a second friction member and a second piston that presses the second friction member; and
the second oil chamber houses therein the second friction member and the coupling input-side member and the coupling output-side member of the fluid coupling, and is formed to be supplied with a hydraulic pressure and to apply a hydraulic pressure to a side of the second piston opposite to a side on which a hydraulic pressure for operation is applied.

11. A vehicle drive device including an input member drivably coupled to a rotary electric machine, an output member drivably coupled to wheels, a first engagement device that selectively drivably couples the input member to an internal combustion engine, and a fluid coupling provided on a power transfer path that connects between the input member and the output member, wherein:

the first engagement device includes a first friction member, a first piston that presses the first friction member, and a first oil chamber that houses the first friction member and that is formed to be supplied with a hydraulic pressure and to apply a hydraulic pressure to a side of the first piston opposite to a side on which a hydraulic pressure for operation is applied;

the fluid coupling includes a second oil chamber that is provided in a body portion housing chamber that houses a body portion of the fluid coupling and that controls an engagement state of a second engagement device in accordance with a hydraulic pressure, the second engagement device being configured to directly couple a coupling input-side member drivably coupled to an input member side of the vehicle drive device and a coupling output-side member drivably coupled to an output member side of the vehicle drive device;

the vehicle drive device comprises a first hydraulic pressure control valve that controls a first oil chamber hydraulic pressure which is a hydraulic pressure to be supplied to the first oil chamber, and a second hydraulic pressure control valve that controls a second oil chamber hydraulic pressure which is a hydraulic pressure to be supplied to the second oil chamber independently of the first oil chamber hydraulic pressure;

the first oil chamber is provided with a circulation passage where oil supplied to a supply port from the first hydraulic pressure control valve flows along the first friction member and is discharged from a discharge port that is different from the supply port, the vehicle drive device further comprising:

a first line pressure control valve that controls an output pressure of a hydraulic pump as a first line pressure; and a second line pressure control valve that controls the first line pressure as a second line pressure by further reducing the first line pressure, wherein:

the first hydraulic pressure control valve is supplied with oil at the first line pressure controlled by the first line pressure control valve, and supplies oil at the first oil chamber hydraulic pressure to the first oil chamber; and the second hydraulic pressure control valve is supplied with oil at the second line pressure controlled by the second line pressure control valve, and supplies oil at the second oil chamber hydraulic pressure to the second oil chamber.

\* \* \* \* \*